US010652112B2

(12) United States Patent
Raney

(10) Patent No.: US 10,652,112 B2
(45) Date of Patent: May 12, 2020

(54) NETWORK TRAFFIC PRE-CLASSIFICATION WITHIN VM PLATFORMS IN VIRTUAL PROCESSING ENVIRONMENTS

(71) Applicant: Keysight Technologies Singapore (Sales) Pte. Ltd., Singapore (SG)

(72) Inventor: Kristopher Raney, Austin, TX (US)

(73) Assignee: KEYSIGHT TECHNOLOGIES SINGAPORE (SALES) PTE. LTD., Singapore (SG)

( * ) Notice: Subject to any disclaimer, the term of this patent is extended or adjusted under 35 U.S.C. 154(b) by 131 days.

(21) Appl. No.: 15/342,170

(22) Filed: Nov. 3, 2016

(65) Prior Publication Data

US 2017/0099197 A1    Apr. 6, 2017

Related U.S. Application Data

(63) Continuation-in-part of application No. 14/873,896, filed on Oct. 2, 2015, now Pat. No. 10,116,528.

(51) Int. Cl.
*H04L 12/26* (2006.01)
*H04L 12/46* (2006.01)
*H04L 29/06* (2006.01)

(52) U.S. Cl.
CPC ........ *H04L 43/028* (2013.01); *H04L 12/4633* (2013.01); *H04L 69/22* (2013.01); *H04L 63/0236* (2013.01); *H04L 63/1408* (2013.01)

(58) Field of Classification Search
CPC ... H04L 12/4633; H04L 43/028; H04L 69/22; H04L 43/022; H04L 2463/143;
(Continued)

(56) References Cited

U.S. PATENT DOCUMENTS 5,515,376 A    5/1996 Murthy et al.
6,321,259 B1    11/2001 Oullette et al.
(Continued)

FOREIGN PATENT DOCUMENTS

WO    2016/053666 A1    4/2016

OTHER PUBLICATIONS

S. Edwards, "Vulnerabilities of Network Intrusion Detection Systems: Realizing and Overcoming the Risks; The Case for Flow Mirroring," Top Layer Networks, Inc., May 1, 2002.
(Continued)

*Primary Examiner* — Un C Cho
*Assistant Examiner* — Shah M Rahman

(57) ABSTRACT

Methods and systems are disclosed that pre-classify network traffic monitored within virtual machine (VM) platforms. Client packet monitor applications operate within client VM platforms to monitor network packets, generate monitored packets representing traffic of interest, determine packet classifications for the monitored packets based upon packet contents, identify tags associated with the packet classifications, encapsulate monitored packets with encapsulation headers including the tags to form encapsulated packets, and forward the encapsulated packets to tool VM platforms. Tool packet monitor applications operate within the tool VM platforms to receive the encapsulated packets, identify packet classifications associated with the tags, remove the encapsulation headers from the encapsulated packets, and forward de-encapsulated packets to network destinations based upon the packet classifications. The tool packet monitor applications can also aggregate de-encapsulated packets having the same packet classification prior to forwarding the aggregated packets to one or more network destinations.

26 Claims, 8 Drawing Sheets

(58) Field of Classification Search
CPC ... H04L 63/0236; H04L 41/046; H04L 43/12; H04L 43/18; H04L 43/50; H04L 63/1408
See application file for complete search history.

(56) References Cited

U.S. PATENT DOCUMENTS

| | | | |
|---|---|---|---|
| 6,578,147 | B1 | 6/2003 | Shanklin et al. |
| 6,785,286 | B1 | 8/2004 | O'Keeffe et al. |
| 6,839,349 | B2 | 1/2005 | Ambe et al. |
| 6,853,623 | B2 | 2/2005 | Nederveen et al. |
| 6,901,517 | B1 | 5/2005 | Redmore |
| 6,920,112 | B1 | 7/2005 | McCloghrie et al. |
| 6,954,775 | B1 | 10/2005 | Shanklin et al. |
| 6,996,779 | B2 | 2/2006 | Meandzij A et al. |
| 7,016,980 | B1 | 3/2006 | Mayer et al. |
| 7,027,437 | B1 | 4/2006 | Merchant et al. |
| 7,142,518 | B2 | 11/2006 | Mitchell |
| 7,143,196 | B2 | 11/2006 | Rimmer et al. |
| 7,254,114 | B1 | 4/2007 | Turner et al. |
| 7,245,620 | B2 | 7/2007 | Shankar |
| 7,310,306 | B1 | 12/2007 | Cheriton |
| 7,424,018 | B2 | 9/2008 | Gallatin et al. |
| 7,554,984 | B2 | 6/2009 | Kalkunte et al. |
| 7,688,727 | B1 | 3/2010 | Ferguson et al. |
| 7,769,873 | B1 | 8/2010 | Mackie |
| 7,889,711 | B1 | 2/2011 | Minei et al. |
| 7,917,647 | B2 | 3/2011 | Cooper et al. |
| 8,018,943 | B1 | 9/2011 | Pleshek et al. |
| 8,098,677 | B1 | 1/2012 | Pleshek et al. |
| 8,151,348 | B1* | 4/2012 | Day ............... H04L 63/1408 709/224 |
| 8,156,209 | B1* | 4/2012 | Phadnis ............ H04L 12/2859 709/223 |
| 8,200,203 | B1 | 6/2012 | Christensen et al. |
| 8,447,718 | B2 | 5/2013 | Norton et al. |
| 8,842,548 | B2 | 9/2014 | Pleshek et al. |
| 8,902,895 | B2 | 12/2014 | Pleshek et al. |
| 8,914,406 | B1* | 12/2014 | Haugsnes ........... H04L 63/1441 707/769 |
| 8,934,495 | B1 | 1/2015 | Hilton et al. |
| 9,075,642 | B1 | 7/2015 | Chalmer et al. |
| 9,110,703 | B2 | 8/2015 | Santos et al. |
| 9,680,728 | B2 | 6/2017 | Besser |
| 10,116,528 | B2 | 10/2018 | Raney |
| 2001/0022786 | A1 | 9/2001 | King et al. |
| 2001/0055274 | A1 | 12/2001 | Hegge et al. |
| 2002/0186259 | A1 | 12/2002 | Meandzija et al. |
| 2003/0046657 | A1 | 3/2003 | White |
| 2003/0074421 | A1 | 4/2003 | Kusano et al. |
| 2004/0003094 | A1 | 1/2004 | See |
| 2004/0042470 | A1 | 3/2004 | Cooper et al. |
| 2004/0103321 | A1 | 5/2004 | Wesinger, Jr. et al. |
| 2004/0107361 | A1 | 6/2004 | Redan et al. |
| 2004/0196841 | A1 | 10/2004 | Tüdor et al. |
| 2005/0053073 | A1 | 3/2005 | Kloth et al. |
| 2005/0182950 | A1 | 8/2005 | Son et al. |
| 2006/0256788 | A1 | 11/2006 | Donahue |
| 2008/0008202 | A1 | 1/2008 | Terrell et al. |
| 2008/0072292 | A1 | 3/2008 | Narjala |
| 2008/0201455 | A1 | 8/2008 | Husain |
| 2008/0222731 | A1 | 9/2008 | Dowd et al. |
| 2009/0007021 | A1 | 1/2009 | Hayton |
| 2009/0013052 | A1 | 1/2009 | Robarts et al. |
| 2009/0150996 | A1 | 6/2009 | Haswell |
| 2009/0172148 | A1 | 7/2009 | Underwood |
| 2009/0238192 | A1* | 9/2009 | Dolganow ............. H04L 47/10 370/400 |
| 2009/0327903 | A1 | 12/2009 | Smith et al. |
| 2010/0017801 | A1 | 1/2010 | Kundapur |
| 2010/0027554 | A1 | 2/2010 | Kuthan et al. |
| 2010/0332618 | A1 | 12/2010 | Norton et al. |
| 2011/0004698 | A1 | 1/2011 | Wu |
| 2011/0317694 | A1 | 12/2011 | Pleshek et al. |
| 2012/0079107 | A1 | 3/2012 | Williams et al. |
| 2012/0099602 | A1 | 4/2012 | Nagapudi et al. |
| 2012/0106354 | A1 | 5/2012 | Pleshek et al. |
| 2012/0210318 | A1 | 8/2012 | Sanghvi et al. |
| 2013/0031233 | A1 | 1/2013 | Feng et al. |
| 2013/0060940 | A1* | 3/2013 | Koponen ............ H04L 12/4633 709/225 |
| 2013/0291109 | A1 | 10/2013 | Staniford et al. |
| 2013/0297769 | A1* | 11/2013 | Chang ................ G06F 9/45558 709/224 |
| 2014/0105216 | A1* | 4/2014 | McDysan ............ H04L 67/1095 370/400 |
| 2014/0115584 | A1* | 4/2014 | Mudigonda ......... H04L 67/1095 718/1 |
| 2014/0229605 | A1 | 8/2014 | Besser |
| 2015/0124828 | A1* | 5/2015 | Cj ..................... H04L 12/4633 370/392 |
| 2015/0180769 | A1* | 6/2015 | Wang .................... H04L 45/38 370/236 |
| 2015/0263889 | A1 | 9/2015 | Newton |
| 2015/0319030 | A1 | 11/2015 | Nachum |
| 2015/0334628 | A1 | 11/2015 | Jeong et al. |
| 2016/0065386 | A1* | 3/2016 | Hari .................... H04L 12/4679 370/254 |
| 2016/0094418 | A1 | 3/2016 | Raney |
| 2016/0110211 | A1 | 4/2016 | Karnes |
| 2016/0359872 | A1* | 12/2016 | Yadav .................... H04L 43/04 |
| 2017/0083354 | A1* | 3/2017 | Thomas ................ G06F 9/455 |
| 2017/0099195 | A1 | 4/2017 | Raney |
| 2017/0099197 | A1 | 4/2017 | Raney |
| 2017/0149670 | A1* | 5/2017 | Backman ............. H04L 67/327 |
| 2017/0163510 | A1 | 6/2017 | Arora et al. |
| 2017/0208037 | A1* | 7/2017 | Hay .................... H04L 63/1416 |

OTHER PUBLICATIONS

A. Esson and J. Mannos, "Broadcom BCM5600 StrataSwitch; A Highly Integrated Ethernet Switch on a Chip," Broadcom Corporation, Hot Chips Aug. 17, 1999.

J. Magee, "The Case for IDS Balancing vs. a Switch," Top Layer Networks, Inc., May 2003.

G. Marshall, SC Magazine Reprint, "Attack Mitigator," Aug. 2002.

F. Muhtar, "Appliances to Boost Network Defence," CyberSecurity Malaysia, Nov. 26, 2001.

National Information Assurance Partnership, Common Criteria Evaluation and Validation Scheme, Validation Report; Top Layer Networks; IDS BalancerTM Version 2.2 Appliance (IDSB3531-CCV1. 0, IDSB3532-CCV1.0, IDSB4508-CCV1.0), Report No. CCEVS-VR-04-0074, National Institute of Standards and Technology; National Security Agency, Sep. 3, 2004.

Radware, "Radware's Smart IDS Management; FireProof and Intrusion Detection Systems; Deployment and ROI," North America Radware, Inc.; International Radware, Ltd., Aug. 21, 2002.

SC Magazine Reprint, "IDS Balancer 3500 Appliance," Jul. 2002.

Top Layer Networks, Inc., "Top Layer Advances Scaleable Intrusion Detection With Industry Leading Multi-Gigabit Offering," Press Release, Mar. 10, 2003.

Top Layer Networks, Inc., "Product Enhancements Optimize Existing Network Intrusion Detection and Prevention Environments," Press Release, Aug. 18, 2003.

Top Layer Networks, Inc., "Case Study—IDS Balancer; Building an Intelligent Monitoring Layer Using the Top Layer IDS Balancer Ensures Full Security Coverage for University of California, Irvine," www.TopLayer.com; 2003.

Top Layer Networks, Inc., "IDS Balancer 3.0 Delivers Ultimate Flexibility in Selecting, Filtering and Distributing Network Traffic," Press Release, Oct. 20, 2004.

Top Layer Networks, Inc., "IDS Balancer; Aggregation, Filtering, & Load Appliance," internet advertisement, ww.TopLayer.com., 2004.

Top Layer Networks, Inc., "APP Switch 2500; The Original Top Layer Device to Perfect the Art of Network Security," internet advertisement, www.TopLayer.com. 2001.

Kristopher Raney, "Selective Scanning of Network Packet Traffic Using Cloud-Based Virtual Machine Tool Platforms," U.S. Appl. No. 14/501,717, filed Sep. 30, 2014.

(56) References Cited

OTHER PUBLICATIONS

Ixia, "A Paradigm Shift for Network Visibility: Delivering Better Data for Better Decisions", Rev. A. May 2014, 14 pgs.
Ixia, "Ixia Application and Threat Intelligence Processor", Data Sheet, May 2014, 3 pgs.
Ixia, "Ixia xFilter", Data Sheet, May 2015, 5 pgs.
Search Report and Written Opinion, PCT/US2016/052589; dated Nov. 18, 2016, 13 pgs.
Hofstede et al., "Flow Monitoring Explained: From Packet Capture to Data Analysis With NetFlow and IPFIX", IEEE, 31 pgs. (May 2014).
Ixia, Ixia Phantom vTap With TapFlow Filtering, Data Sheet, 4 pgs. (Jul. 2015).
Ixia, Ixia Flex Tap, Data Sheet, 5 pgs. (Oct. 2015).
Notice of Allowance dated Jun. 17, 2018, Kristopher Raney, "Direct Network Traffic Monitoring Within VM Platforms in Virtual Processing Environments" U.S. Appl. No. 14/873,896, filed Oct. 2, 2015, 5 pgs.
Office Action dated Jun. 15, 2017, Kristopher Raney, "Direct Network Traffic Monitoring Within VM Platforms in Virtual Processing Environments" U.S. Appl. No. 14/873,896, filed Oct. 2, 2015, 21 pgs.
Final Office Action dated Dec. 1, 2017, Kristopher Raney, "Direct Network Traffic Monitoring Within VM Platforms in Virtual Processing Environments" U.S. Appl. No. 14/873,896, filed Oct. 2, 2015, 29 pgs.
Advisory Action dated Mar. 7, 2018, Kristopher Raney, "Direct Network Traffic Monitoring Within VM Platforms in Virtual Processing Environments" U.S. Appl. No. 14/873,896, filed Oct. 2, 2015, 4 pgs.
Response to Office Action filed Sep. 14, 2017, Kristopher Raney, "Direct Network Traffic Monitoring Within VM Platforms in Virtual Processing Environments" U.S. Appl. No. 14/873,896, filed Oct. 2, 2015, 12 pgs.
Response to Final Office Action filed Feb. 1, 2018, Kristopher Raney, "Direct Network Traffic Monitoring Within VM Platforms in Virtual Processing Environments" U.S. Appl. No. 14/873,896, filed Oct. 2, 2015, 10 pgs.
Response to Advisory Action filed Apr. 2, 2018, Kristopher Raney, "Direct Network Traffic Monitoring Within VM Platforms in Virtual Processing Environments" U.S. Appl. No. 14/873,896, filed Oct. 2, 2015, 11 pgs.
Notice of Allowance dated Jun. 15, 2018, Kristopher Raney, "Direct Network Traffic Monitoring Within VM Platforms in Virtual Processing Environments" U.S. Appl. No. 14/873,896, filed Oct. 2, 2015, 5 pgs.
Advisory Action mailed Mar. 7, 2018, Kristopher Raney, "Direct Network Traffic Monitoring Within VM Platforms in Virtual Processing Environments" U.S. Appl. No. 14/873,896, filed Oct. 2, 2015, 4 pgs.
European Search Report; Application No. 16852312.4; dated Mar. 1, 2019, 8 pgs.
European Search Report; Application No. 16852312.4; dated Jan. 3, 2019, 8 pgs.

* cited by examiner

NETWORK TRAFFIC PRE-CLASSIFICATION WITHIN VM PLATFORMS IN VIRTUAL PROCESSING ENVIRONMENTS

RELATED APPLICATIONS

This application is a continuation-in-part application of U.S. patent application Ser. No. 14/873,896, entitled "DIRECT NETWORK TRAFFIC MONITORING WITHIN VM PLATFORMS IN VIRTUAL PROCESSING ENVIRONMENTS" and filed Oct. 2, 2015, which is hereby incorporated by reference in its entirety.

TECHNICAL FIELD OF THE INVENTION

This invention relates to monitoring packet flows for network communications and, more particularly, to monitoring such packet flows within virtual processing environments.

BACKGROUND

Packet-based data networks continue to grow in importance, and it is often desirable to monitor network traffic associated with these packet-based networks on an ongoing basis. To meet these monitoring needs, copies of network packets can be forwarded to diagnostic network monitoring tools. Packets are often forwarded using network hubs, test access ports (TAPs), and/or switched port analyzer (SPAN) ports available on network switch systems.

To help alleviate the problem of limited access to network packets for monitoring, tool aggregation devices or packet broker devices have also been developed that allow shared access to the monitored network packets. In part, these network packet broker devices allow users to obtain packets from one or more network monitoring points (e.g., network hubs, TAPs, SPAN ports, etc.) and to forward them to different monitoring tools. Network packet brokers can be implemented as one or more packet processing systems in hardware and/or software that provide access and visibility to multiple monitoring tools. These network packet brokers can also aggregate monitored traffic from multiple source links and can load balance traffic of interest to various tools. The traffic of interest can be network packets that are selected by the packet brokers through packet filters and related packet forwarding rules that identify particular packets or packet flows from within the monitored network traffic as traffic of interest.

Network packet analysis tools include a wide variety of devices that analyze packet traffic, including traffic monitoring devices, packet sniffers, data recorders, voice-over-IP monitors, intrusion detection systems, network security systems, application monitors, and/or other network tool devices or systems. Network analysis tools, such as traffic analyzers, are used within packet-based data networks to determine details about the network packet traffic flows within the packet communication network infrastructure.

Certain network communication systems also include virtual processing environments that include virtual machine (VM) platforms hosted by one or more VM host servers. For example, network applications and resources can be made available to network-connected systems as virtualized resources operating within virtualization layers on VM host servers. In some embodiments, processors or other programmable integrated circuits associated with a server processing platform (e.g., server blade) and/or combinations of such server processing platforms operate to provide virtual machine platforms within the server processing platforms. A virtual machine (VM) platform is an emulation of a processing system or network application that is formed and operated within virtualization layer software being executed on a VM host hardware system. By operating multiple VM platforms and/or application instances within such a virtualization layer also operating on VM host hardware system, a variety of processing resources can be provided internally to the virtual processing environment and/or externally to other network-connected processing systems and devices.

When a network to be monitored includes virtual processing environments, however, difficulties arise in monitoring packet traffic for network communications with VM platforms operating within such virtual processing environments to provide various application resources. For example, web based computing services (e.g., Amazon web services) allow a wide variety of external network-connected users to obtain dedicated and elastic processing resources within virtual processing environments running on a large number of interconnected servers. These external users can install, initialize, and operate a wide variety of user application as instances within VM platforms operating within the virtual processing environment. Further, the external users can be corporate or commercial entities that provide multiple different application services to employees and/or end-user consumers of the processing resources. When one or more of these external users desires to monitor traffic with respect to their respective VM platforms, difficulties arise in identifying and forwarding relevant traffic for packet analysis to network monitoring tools within and outside of the virtual processing environment.

SUMMARY OF THE INVENTION

Methods and systems are disclosed that pre-classify network traffic monitored within virtual machine (VM) platforms operating within virtual processing environments. For the disclosed embodiments, the network environment includes one or more client applications communicating network packets within a network communication system and operating within a client VM platform in turn operating within a VM host server. A client packet monitor application also operates within the client VM platform to monitor the network packets, to generate monitored packets representing traffic of interest, to determine packet classifications for the monitored packets based upon contents of the monitored packets, to identify tags associated with the packet classifications, to encapsulate monitored packets with encapsulation headers including the tags to form encapsulated packets, and to forward the encapsulated packets to a tool VM platform operating within a VM host server. A tool packet monitor application also operates within the tool VM platform to receive the encapsulated packets, to identify packet classifications associated with the tags included within the encapsulated packets, to remove the encapsulation headers from the encapsulated packets to generate de-encapsulated packets, and to forward the de-encapsulated packets to one or more network destinations based upon the packet classifications. Multiple client VM platforms and related client packet monitor applications can also operate within the network communication system to forward encapsulated packets, and multiple tool VM platforms and related tool packet monitor applications can also operate within the network communication system to receive encapsulated packets. The tool packet monitor applications can also be configured to de-encapsulate the encapsulated packets and to aggregate de-encapsulated packets having the same packet classification prior to forwarding the aggregated packets to one or more network destinations. Other features and variations can be implemented, if desired, and related systems and methods can be utilized, as well.

For one embodiment, a method is disclosed to monitor packet traffic that includes communicating network packets using one or more client applications operating within a client virtual machine (VM) platform operating within a first VM host server, operating a client packet monitor application within the client VM platform, and operating a tool packet monitor application within a tool VM platform operating within a second VM host server. Further, at the client packet monitor application, the method includes monitoring the network packets to generate monitored packets representing traffic of interest, determining packet classifications for the monitored packets based upon contents of the monitored packets, identifying tags associated with the packet classifications, encapsulating the monitored packets with encapsulation headers to form encapsulated packets, the encapsulation headers including the tags, and forwarding the encapsulated packets to the tool VM platform. Further, at the tool packet monitor application, the method includes receiving the encapsulated packets, identifying packet classifications associated with the tags included within the encapsulated packets, removing the encapsulation headers from the encapsulated packets to generate de-encapsulated packets, and forwarding the de-encapsulated packets to one or more network destinations based upon the packet classifications.

In additional embodiments, the one or more network destinations include one or more tool applications operating within the tool VM platform. In further embodiments, the encapsulation headers are GRE (generic routing encapsulation) headers. In still further embodiments, the tags are included within a key field for the GRE headers, and each tag represents a unique packet classification.

In additional embodiments, the method includes, at the client packet monitor application, searching classification-to-tag mapping data to identify the tags associated with the packet classifications. In further embodiments, the method includes, at the client packet monitor application, receiving mapping data from a traffic configuration platform operating within a third VM host server and storing the mapping data as the classification-to-tag mapping data. In additional embodiments, the method includes, at the tool packet monitor application, searching tag-to-classification mapping data to identify the tags associated with the packet classifications. In further embodiments, the method includes, at the tool packet monitor application, receiving mapping data from a traffic configuration platform operating within a third VM host server and storing the mapping data as the tag-to-classification mapping data.

In additional embodiments, network packets are communicated by a plurality of client VM platforms operating within at least one of the first VM host server or the first VM host server and one or more additional VM host servers; and each of the client VM platforms has a client packet monitor application preforming the monitoring, determining, identifying, encapsulating, and forwarding. In further embodiments, the tool packet monitor application receives encapsulated packets from the plurality of client VM platforms, aggregates de-encapsulated packets with same packet classifications into an aggregated packet flow, and forwards the aggregated packet flow to one or more network destinations.

In additional embodiments, the encapsulated network packets are received by a plurality of tool VM platforms operating within at least one of the second VM host server or the second VM host server and one or more additional VM host servers, and each of the tool VM platforms has a tool packet monitor application performing the receiving, identifying, removing, and forwarding. In further embodiments, the tool packet monitor applications within the plurality of tool VM platforms aggregate de-encapsulated packets with same packet classifications into aggregated packet flows and forward the aggregated packet flows to one or more network destinations. In further embodiments, the plurality of client VM platforms operate within a plurality of VM host servers including the first VM host server, and the plurality of tool VM platforms operate within a plurality of tool VM platforms including the second VM host server.

In additional embodiments, each of the VM platforms operates on a virtualization layer within the one or more VM host servers, and the virtualization layer includes at least one of a hypervisor or a container engine running within the one or more VM host servers.

For one embodiment, a system is disclosed to monitor packet traffic that includes a first virtual machine (VM) host server configured to host one or more client applications operating within a client virtual machine (VM) platform with the one or more client applications being configured to generate network packets, and a second VM host server configured to host a tool VM platform. Further, the first VM host server is further configured to host a client packet monitor application, the client packet monitor application being configured to monitor the network packets to generate monitored packets representing traffic of interest, determine packet classifications for the monitored packets based upon contents of the monitored packets, identify tags associated with the packet classifications, encapsulate the monitored packets with encapsulation headers including the tags to form encapsulated packets, and forward the encapsulated packets to the tool VM platform. Further, the second VM host server is further configured to host a tool packet monitor application configured to receive the encapsulated packets, identify packet classifications associated with the tags included within the encapsulated packets, remove the encapsulation headers from the encapsulated packets to generate de-encapsulated packets, and forward the de-encapsulated packets to one or more network destinations based upon the packet classifications.

In additional embodiments, the one or more network destinations include one or more tool applications configured to operate within the tool VM platform. In further embodiments, the encapsulation headers are GRE (generic routing encapsulation) headers. In still further embodiments, the tags are included within a key field for the GRE headers, and wherein each tag represents a unique packet classification.

In additional embodiments, the client packet monitor application is further configured to search classification-to-tag mapping data to identify the tags associated with the packet classifications. In further embodiments, the client packet monitor application is further configured to receive mapping data from a traffic configuration platform operating within a third VM host server and to store the mapping data as the classification-to-tag mapping data. In additional embodiments, the tool packet monitor application is further configured to search tag-to-classification mapping data to identify the tags associated with the packet classifications. In further embodiments, the tool packet monitor application is configured to receive mapping data from a traffic configuration platform operating within a third VM host server and to store the mapping data as the tag-to-classification mapping data.

In additional embodiments, a plurality of client VM platforms are configured to operate within at least one of the first VM host server or the first VM host server and one or more additional VM host servers; and each of the client VM platforms is configured to host a client packet monitor application configured to generate monitored packets representing traffic of interest, determine packet classifications for the monitored packets based upon contents of the monitored packets, identify tags associated with the packet classifications, encapsulate the monitored packets with encapsulation headers including the tags to form encapsulated packets, and forward the encapsulated packets to the tool VM platform. In further embodiments, the tool packet monitor application is further configured to receive encapsulated packets from the plurality of client VM platforms, to aggregate de-encapsulated packets with same packet classifications into an aggregated packet flow, and to forward the aggregated packet flow to one or more network destinations.

In additional embodiments, a plurality of tool VM platforms are configured to receive the encapsulated network packets and to operate within at least one of the second VM host server or the second VM host server and one or more additional VM host servers; and each of the tool VM platforms is configured to host a tool packet monitor application configured to receive the encapsulated packets, identify packet classifications associated with the tags included within the encapsulated packets, remove the encapsulation headers from the encapsulated packets to generate de-encapsulated packets, and forward the de-encapsulated packets to one or more network destinations based upon the packet classifications. In further embodiments, the tool packet monitor applications within the plurality of tool VM platforms are further configured to aggregate de-encapsulated packets with same packet classifications into aggregated packet flows and to forward the aggregated packet flows to one or more network destinations. In further embodiments, the plurality of client VM platforms are configured to operate within a plurality of VM host servers including the first VM host server, and wherein the plurality of tool VM platforms are configured to operate within a plurality of tool VM platforms including the second VM host server.

In additional embodiments, each of the VM platforms operates on a virtualization layer within the one or more VM host servers, and the virtualization layer includes at least one of a hypervisor or a container engine running within the one or more VM host servers.

Different or additional features, variations, and embodiments can be implemented, if desired, and related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Methods and systems are disclosed that pre-classify network traffic monitored within virtual machine (VM) platforms operating within virtual processing environments. For the disclosed embodiments, the network environment includes one or more client applications communicating network packets within a network communication system and operating within a client VM platform in turn operating within a VM host server. A client packet monitor application also operates within the client VM platform to monitor the network packets, to generate monitored packets representing traffic of interest, to determine packet classifications for the monitored packets based upon contents of the monitored packets, to identify tags associated with the packet classifications, to encapsulate monitored packets with encapsulation headers including the tags to form encapsulated packets, and to forward the encapsulated packets to a tool VM platform operating within a VM host server. A tool packet monitor application also operates within the tool VM platform to receive the encapsulated packets, to identify packet classifications associated with the tags included within the encapsulated packets, to remove the encapsulation headers from the encapsulated packets to generate de-encapsulated packets, and to forward the de-encapsulated packets to one or more network destinations based upon the packet classifications. Multiple client VM platforms and related client packet monitor applications can also operate within the network communication system to forward encapsulated packets, and multiple tool VM platforms and related tool packet monitor applications can also operate within the network communication system to receive encapsulated packets. The tool packet monitor applications can also be configured to de-encapsulate the encapsulated packets and to aggregate de-encapsulated packets having the same packet classification prior to forwarding the aggregated packets to one or more network destinations. Different features and variations can also be implemented, as desired, and related systems and methods can be utilized, as well.

Figure 1:
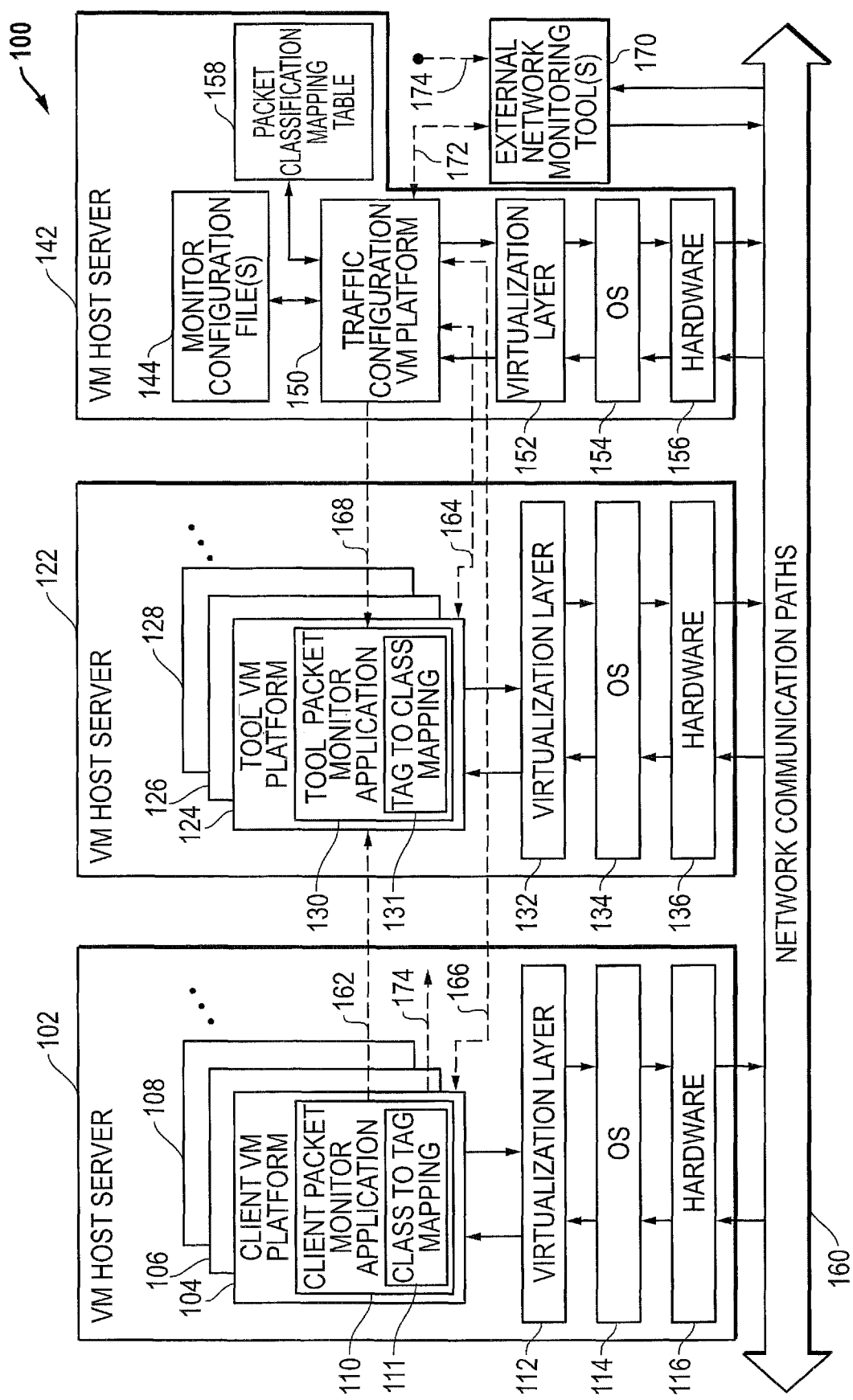
FIG. 1 is a block diagram of an example embodiment for a network traffic monitoring environment where client packet monitor applications operating within VM (virtual machine) platforms classify and encapsulate packets from monitored packet flows prior to forwarding packets to network destinations such as tool packet monitoring applications.
Figure 2:
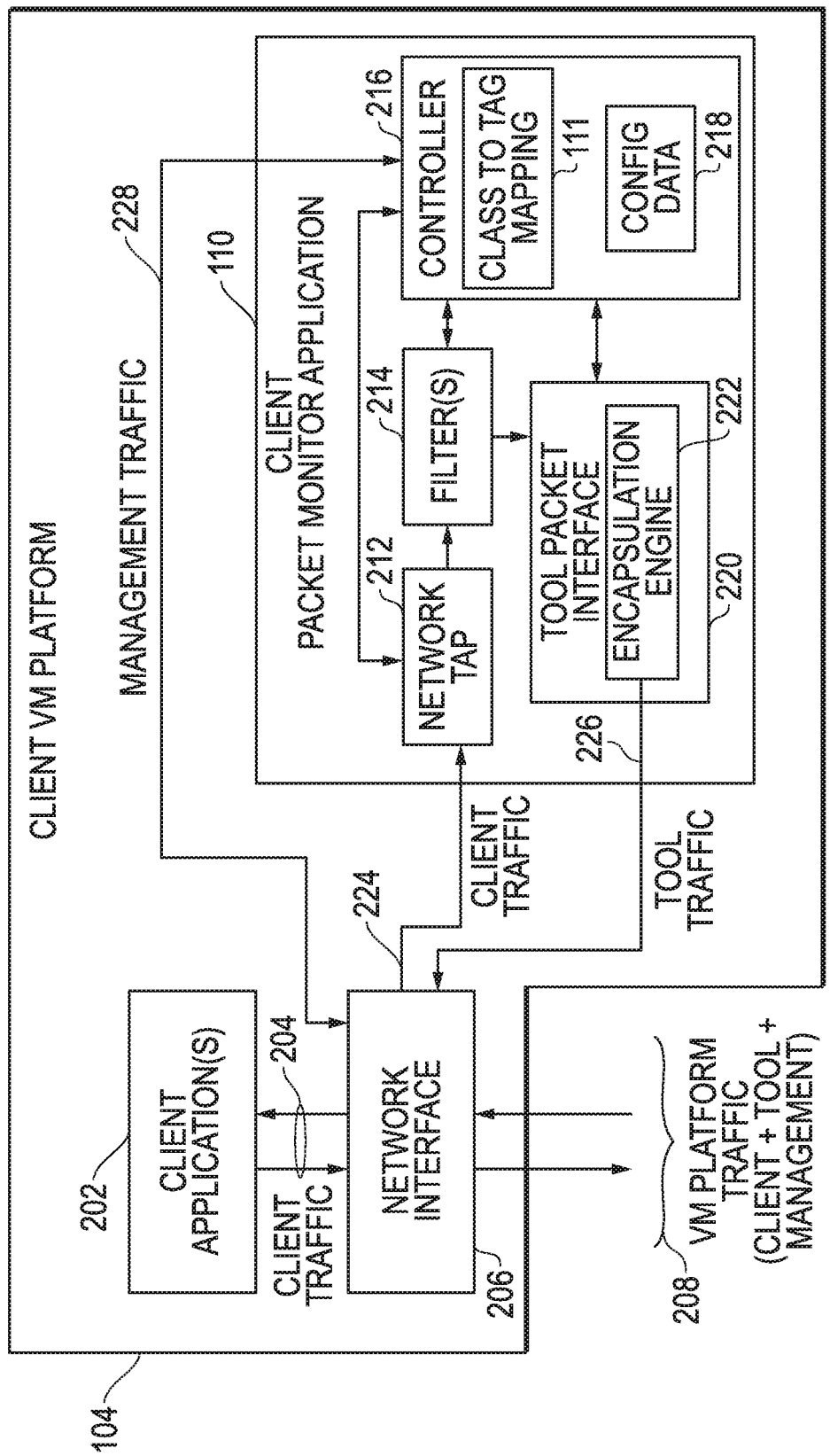
FIG. 2 is a block diagram of an example embodiment for a client VM platform that includes a client packet monitor application and stores classification-to-tag mapping data as well as other configuration data.
Figure 3:
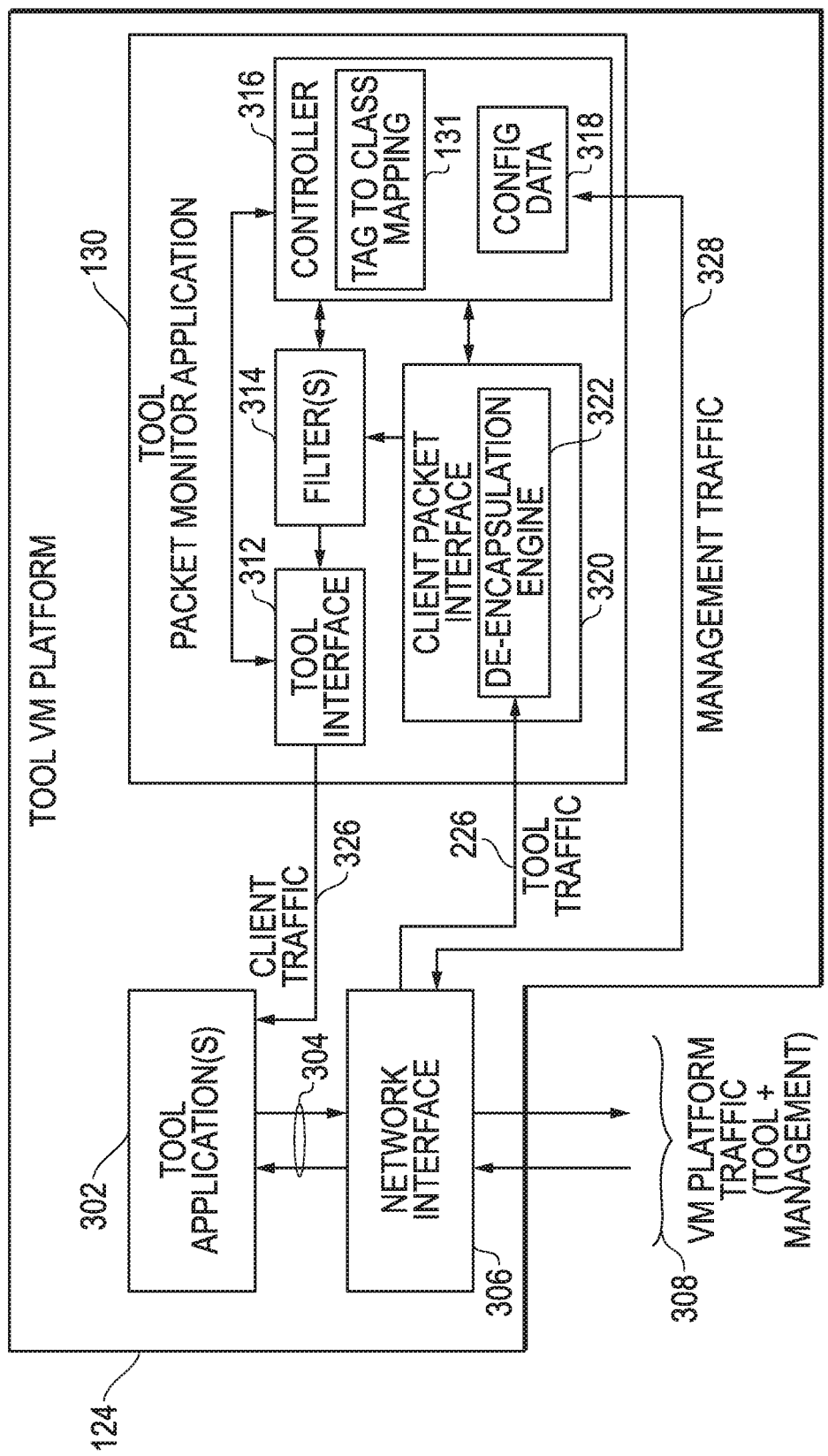
FIG. 3 is a block diagram of an example embodiment for a tool VM platform that includes a tool packet monitor application and stores tag-to-classification mapping data as well as other configuration data.
Figure 4:
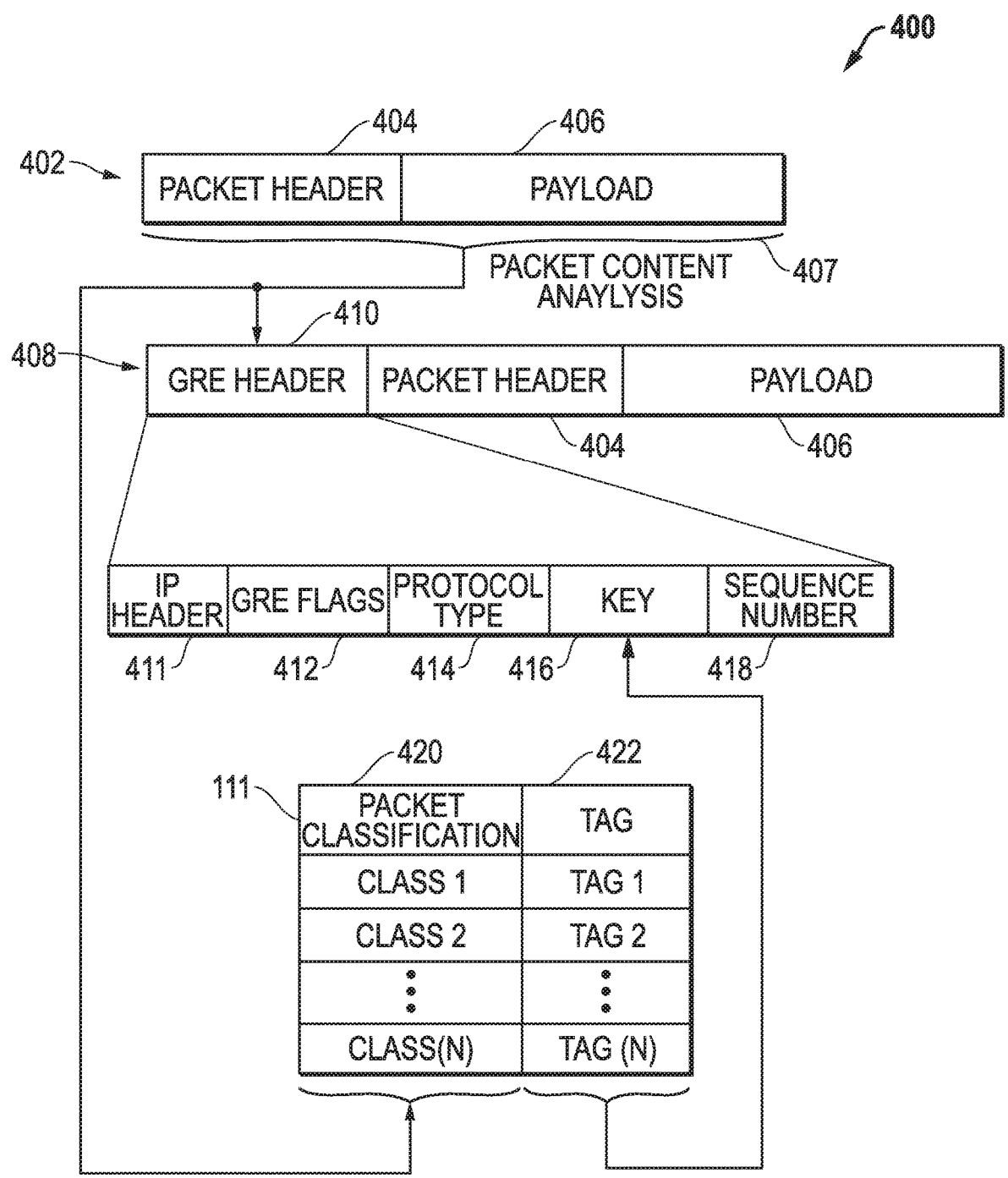
FIG. 4 is a diagram of an example embodiment for GRE (general routing encapsulation) headers and related classification tagging of monitored packets.
Figure 5:
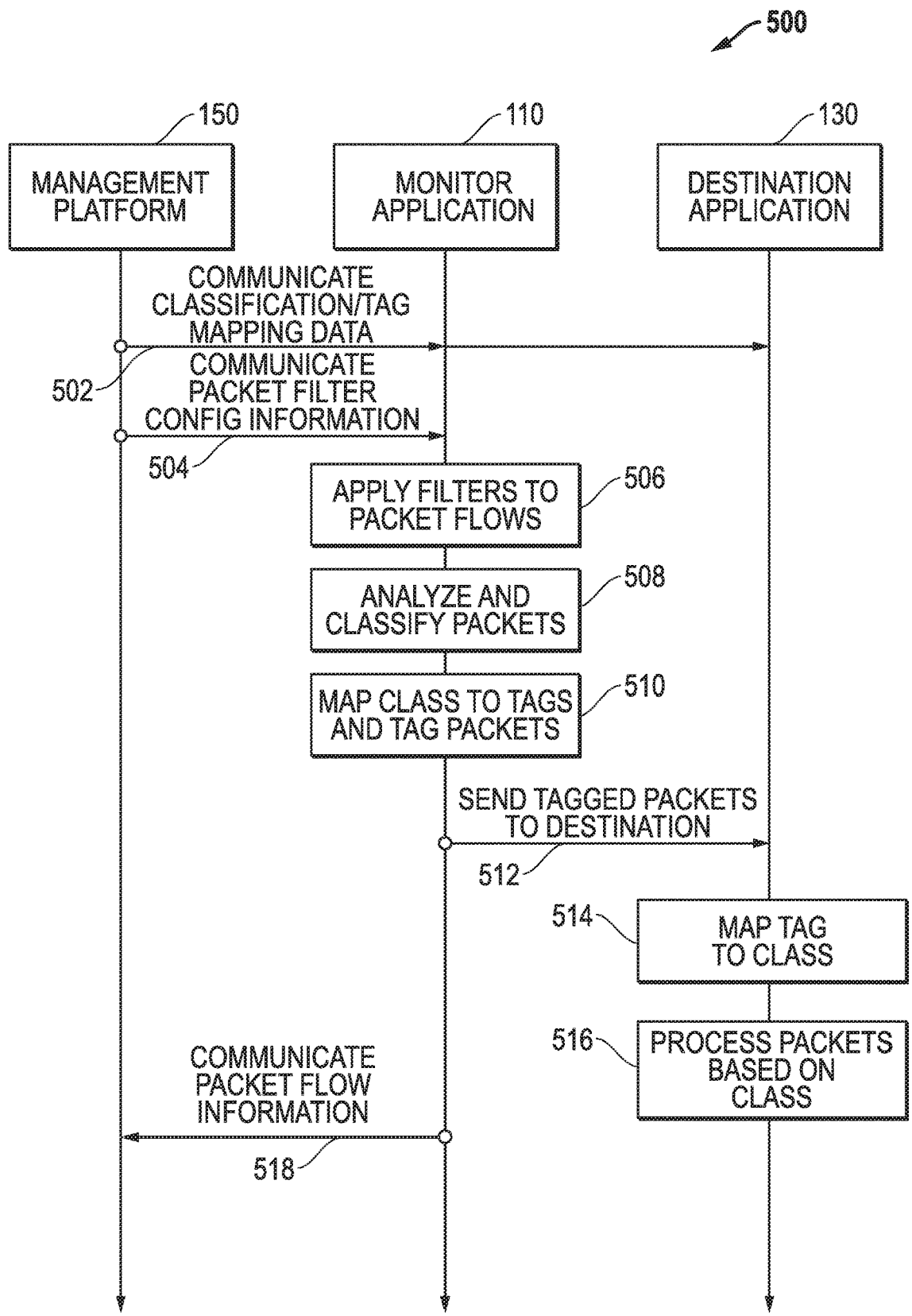
FIG. 5 is a swim lane diagram of an example embodiment where received packets are tagged based upon packet classifications determined by client packet monitor application and processed by destination applications to map the tags back to classifications.
Figure 6:
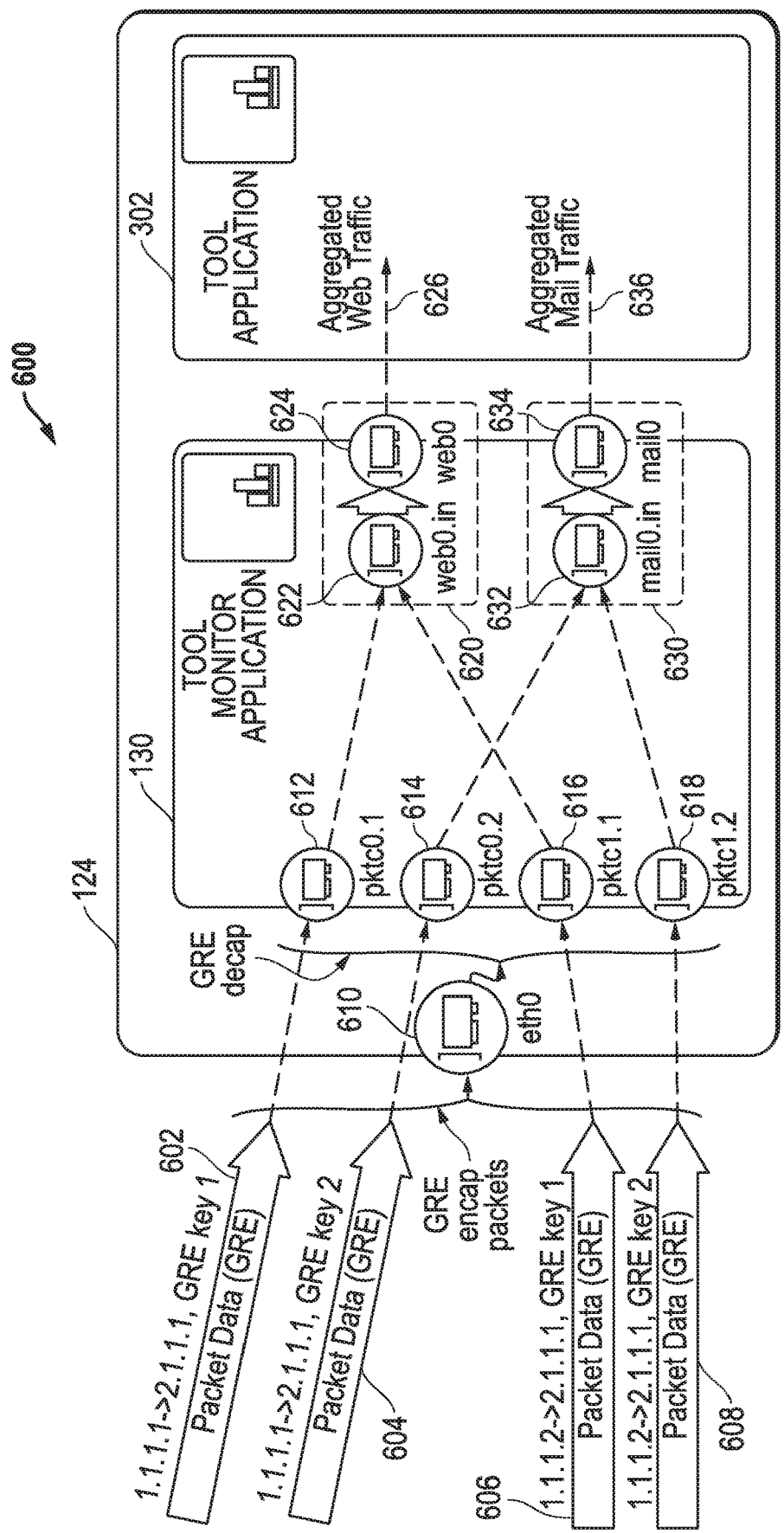
FIG. 6 is a diagram of an example embodiment for encapsulated packet data forwarded to a client packet monitor application within a VM platform using GRE headers and GRE key identifiers representing packet classifications.
Figure 8:
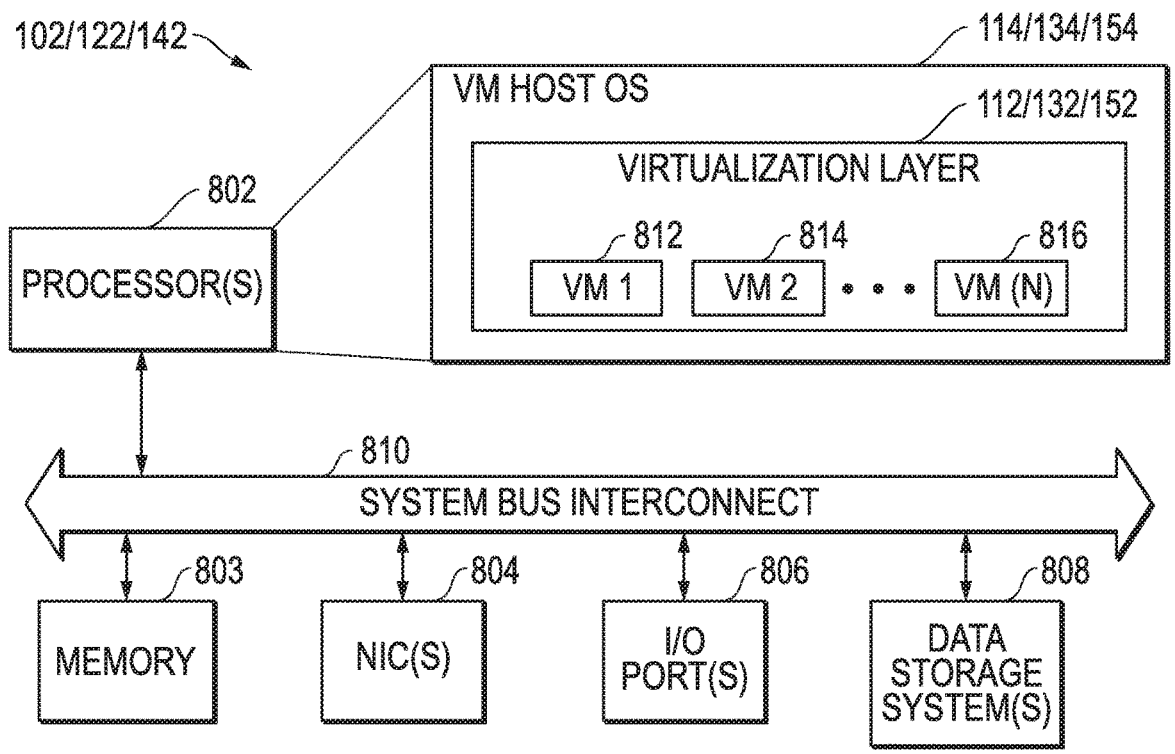
FIG. 8 is a block diagram of an example embodiment for a VM host server.
Figures 9A, 9B:
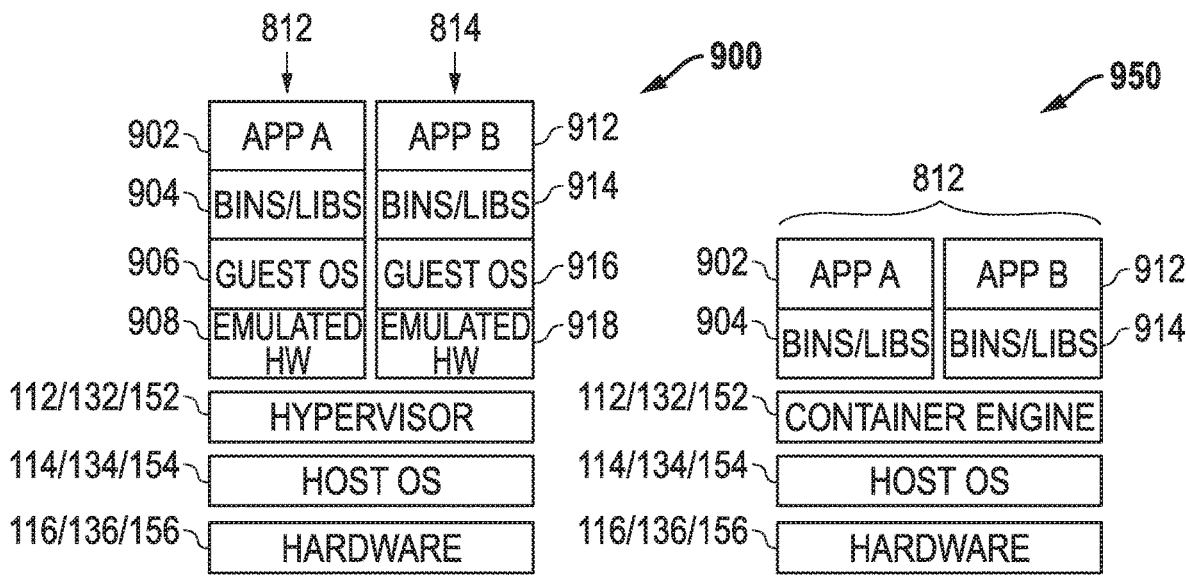
FIG. 9A is a block diagram of an example embodiment for a VM host server that uses a hypervisor to provide a virtualization layer.
FIG. 9B is a block diagram of an example embodiment for a VM host server that uses a container engine to provide a virtualization layer.

Example embodiments are new described in more detail with respect to the drawings. FIGS. 1-3 provide example embodiments for virtual processing environments including client VM platforms, related client packet monitor applications, tool VM applications, related tool packet monitor applications, and traffic configuration VM platforms. FIGS. 4-5 provide example embodiments that add encapsulation headers and classification tags to monitored packets and de-encapsulate the encapsulated packets. FIGS. 6-7A-B provide example embodiments that aggregate de-encapsulated packets having the same packet classifications. FIGS. 8 and 9A-B provide example hardware/software environments. It is further noted that other variations and features can also be implemented while still taking advantage of the client monitor application pre-classification techniques described herein.

FIG. 1 is a block diagram of an example embodiment 100 for a network traffic monitoring environment where client packet monitor applications 110 operating within VM platforms 104, 106, 108 . . . classify and encapsulate packets from monitored packet flows prior to forwarding packets to network destinations such as tool packet monitoring applications 130. For example embodiment 100, a traffic management VM platform 150 operates on host server 142 and is configured to manage packet monitor applications 110/130 operating within VM platforms on VM host servers 102 and 122. In particular, one or more client VM platforms 104, 106, 108 . . . operate within a first VM host server 102; one or more tool VM platforms 124, 126, 128 . . . operate within a second VM host server 122; and a traffic management VM platform 150 operates within a third VM host server 142. The host VM servers 102, 122, and 142 are configured to communicate with each other through one or more external network communication paths 160. The external network communication paths 160 can include wired network communication paths, wireless network communication paths, or a combination of wired and wireless communication paths, and the external network communication paths 160 can include one or more intervening network communication devices or systems within a network communication infrastructure. Further, one or more different communication protocols can be used within the network communication paths 160 to communicate network packets within the network communication paths 160. It is further noted that the communications 162, 164, 166, 168, 172, and 174 can occur through the network communication paths 160, through additional network communication paths, through direct out-of-band communication paths, and/or through other communication paths between the particular network source(s) and destination(s).

Looking to VM host server 102, the client VM platforms 104, 106, 108 . . . operate within a virtualization layer 112 that operates on top of an operating system (OS) 114 which in turn operates on computer hardware 116. The computer hardware 116 is coupled to communicate with the network communication paths 160, for example, through one or more network interface cards and/or other network connections. The client VM platforms 104, 106, 108 . . . can be configured, for example, to operate in part to provide one or more network applications that communicate packets through the external network communication paths 160 and/or with each other. As represented by client VM platform 104, each of the client VM platforms 104, 106, 108 . . . includes a client packet monitor application 110. As described herein, the client packet monitor application 110 operates to monitor packet traffic within the client VM platform 104, to classify monitored packet traffic, to encapsulate the classified packet traffic, and to forward copies of this encapsulated packet traffic to one or more of the tool VM platforms 124, 126, 128 . . . within one or more VM host servers as represented by dashed arrow 162. Copies of packet traffic can also be forwarded to the traffic configuration platform 150 as represented by dashed arrow 166, to external network monitoring tools 170 as represented by dashed line 174, and/or to other network destinations.

The client monitor application 110 within each of the VM platforms 104, 106, 108 . . . also stores classification-to-tag mapping data 111. As described herein, the classification-to-tag mapping data 111 maps packet classifications to tags that are subsequently embedded within the encapsulated packets to identify the packet classifications for the monitored packet traffic. For certain example embodiments, these tags are added within a field within a GRE (generic routing encapsulation) header added to received packets before they are forwarded by the client packet monitor application 110 to network destinations such as to tool packet monitor applications 130 operating within tool VM platforms 124, 126, 128 . . . and/or external network monitoring tools 170. It is noted that the classification-to-tag mapping data 111 can be stored as one or more searchable tables within one or more data storage devices.

Looking to VM host server 122, the tool VM platforms 124, 126, 128 . . . operate within a virtualization layer 132 that operates on top of an operating system (OS) 134 which in turn operates on computer hardware 136. The computer hardware 136 is coupled to communicate with the network communication paths 160, for example, through one or more network interface cards and/or other network connections. The tool VM platforms 124, 126, 128 . . . can be configured, for example, to operate in part to provide one or more network packet analysis tool applications that analyze received packets. As represented by tool VM platform 124, each of the tool VM platforms 124, 126, 128 . . . includes a tool packet monitor application 130. As described herein, the tool packet monitor application 130 within each tool VM platform 124, 126, 128 . . . operates to de-encapsulate monitored packet traffic received from one or more of the client packet monitor applications 110 within the client VM platforms 104, 106, 108 . . . and to provide this monitored traffic for further processing by tool applications also operating within the tool VM platforms 124, 126, 128 . . . along with the tool packet monitor application 130.

The tool monitor application 130 within each of the VM platforms 124, 126, 128 . . . also store tag-to-classification mapping data 131. As described herein, the tag-to-classification mapping data 131 maps tags that are embedded within the encapsulated packets to associated packet classifications. For certain example embodiments, these tags are stored within a field within a GRE header added to forwarded packets by the client packet monitor applications 110 before they are forwarded to network destinations such as the tool packet monitor applications 130 operating within the tool VM platforms 124, 126, 128 . . . and/or external network monitoring tools 170. It is noted that the tag-to-classification mapping data 131 can be stored as one or more searchable tables within one or more data storage devices.

Looking to VM host server 142, the traffic management VM platform 150 operates within a virtualization layer 152 that operates on top of an operating system (OS) 154 which in turn operates on computer hardware 156. The computer hardware 156 is coupled to communicate with the network communication paths 160, for example, through one or more network interface cards and/or other network connections. The traffic management VM platform 150 can be configured, for example, to initialize, control, and/or otherwise manage the client VM monitor application(s) 110 and the tool packet monitor application(s) 130 as represented by dashed lines 164 and 166. For example, the traffic management VM platform 150 can use one or more monitor configuration files 144 to initialize, configure, and/or otherwise manage the client packet monitor applications 110 and the tool packet monitor applications 130.

The traffic configuration VM platform 150 monitor application also stores a packet classification mapping table 158. As described herein, the mapping table 158 maps packet classifications to tags that will be embedded within the packets to identify the packet classifications by the client monitor applications 110. The traffic configuration VM platform 150 communicates mapping data from the packet classification mapping table 158 to the client packet monitor applications 110, and the client packet monitor applications 110 store this mapping data as the classification-to-tag mapping data 111. The traffic configuration VM platform 150 also communicates mapping data from the packet classification mapping table 158 to the tool packet monitor applications 130, and the tool packet monitor applications 130 store this mapping data as the tag-to-classification mapping data 131. For certain example embodiments, the tags added by the client packet monitor applications 110 are tags added within a field within a GRE header added to monitored packets.

It is noted that while the client VM platforms 104, 106, 108 . . . are shown as operating within a single VM host server 102, these client VM platforms could also be distributed among multiple VM host servers. Similarly, while the tool VM platforms 124, 126, 128 . . . are shown as operating within VM host server 122, these tool VM platforms could also be distributed among multiple VM host servers. In addition, while the traffic management VM platform 150 is shown as operating within a single VM host server 142, multiple traffic management VM platforms could be distributed among a plurality of VM host servers. The traffic management VM platform 150 could also be implemented as a stand-alone processing system or device rather than a VM platform operating within a VM host server 142. Other variations could also be implemented. Further, client VM platforms, tool VM platforms, and/or traffic management VM platforms can also be included within a common VM host server. As such, the various VM platforms for embodiment 100 can be distributed as desired among one or more VM host servers.

In operation, the client packet monitor applications 110 within the VM platforms 104, 106, 108 . . . facilitate packet monitoring within the overall system by analyzing packet flows, classifying packets within those packet flows, encapsulating the monitored packets, and tagging the packets with tags that indicate the packet classifications. The encapsulated and tagged packets can then be sent to one or more network destinations such as one or more tool VM platforms 124, 126, 128 . . . , the traffic configuration VM platform 150, one or more external network monitoring tools 170, and/or another network destination. Tool packet monitor applications 130 within network destination receive these encapsulated and tagged packets and use the tags along with the tag-to-classification mapping data 131 to determine the classification for the packets without having to analyze the remaining packet contents. This pre-classification of packets provided by the client packet monitor applications 110 greatly improves the speed and efficiency of the overall network monitoring system. Further, packets with the same classifications can be aggregated and then communicated through a common data path to one or more network destination as described further below.

It is noted that installing tap functionality through the client packet monitor applications 110 within each of the client VM platforms 104, 106, 108 . . . provides a number of advantages. For example, scaling is handled implicitly as the client packet monitor applications will scale directly with the scaling of the client VM platforms. New client VM platform instances will include the client packet monitor application, and any reduction in the number of client VM platform instances will also remove any client packet monitor applications running in those client VM platform instances. In addition, by being inside the client VM platform, the client packet monitor applications 110 are also behind any load balancer feeding packets to the client VM platforms thereby allowing for any prior load balancing to still be effective. Security is also improved and new risks are not introduced because packet security protections can remain unchanged as packets are obtained at the operating (OS) level and are obtained within a user's own network application context. Further, from inside the client VM platforms 104, 106, 108 . . . , the client packet monitor applications 110 have access to metadata that is outside the contents of the packet itself allowing for a broader basis for high-level forwarding configurations. For example, packet collection or filtering decisions can be made on the basis of operating system (OS), platform metadata, processing metrics (e.g., CPU load), and/or desired information apart from the packets contents themselves. Further examples of information outside the packet contents, which can be used to configure client/tool packet monitor applications and/or to generate filter configurations, include hardware architectures (e.g., number of processors, types of processors, numbers of network interfaces, types of network interfaces), hardware metrics (e.g., processor utilization, memory utilization), operating systems, hypervisor types, VM platform instance metadata (e.g., hostname, virtual operating system, kernel version, other software versions), processing environment information, client provided metadata, and/or other types of data not within the packets themselves. Other variations can also be implemented and other advantages may also be achieved while still taking advantage of the client monitor application pre-classification techniques described herein.

It is further noted that U.S. patent application Ser. No. 14/873,896, entitled "DIRECT NETWORK TRAFFIC MONITORING WITHIN VM PLATFORMS IN VIRTUAL PROCESSING ENVIRONMENTS" and filed Oct. 2, 2015, describes various embodiments including packet monitoring embodiments where client monitor applications are installed within VM platforms. This U.S. patent application Ser. No. 14/873,896 is hereby incorporated by reference in its entirety.

FIG. 2 is a block diagram of an example embodiment for a client VM platform 104 that includes a client packet monitor application 110 and stores classification-to-tag mapping data 111 as well as other configuration data 218. The client packet monitor application 110 includes a network TAP 212, one or more filters 214, tool packet interface 220, and controller 216. The tool packet interface 220 also includes an encapsulation engine 222, and the controller 216 operates to store and use classification-to-tag data 111 and other configuration (CONFIG) data 218. The client VM platform 104 in part operates to provide one or more client applications 202 that generate and receive packets as client traffic 204 through a virtual network interface 206. The virtual network interface 206 in turn communicates VM platform traffic 208 with other VM platforms operating within the same VM host server and/or with external VM platforms or systems through the network communication paths 160. As described herein, this VM platform traffic 208 includes client traffic 204, tool traffic 226 directed to one or more tool packet monitor applications 130 or other destinations, management traffic 228 communicated with the traffic management VM platform 150, and any other traffic for the client VM platform 104.

In operation, the client network TAP 212 for the client packet monitor application 110, which can be implemented as any desired virtual component that obtains copies of packets, obtains copies 224 of the client traffic 204 being communicated through the network interface 206. This copied traffic 224 is then processed by one or more filters 214 to identify traffic of interest for one or more network analysis tools. The controller 216 also analyzes the contents of the traffic of interest to classify the packets based upon their packet contents and uses the classification-to-tag mapping data 111 to identify tags associated with the packet classifications. This traffic of interest is sent to the tool packet interface 220 which uses the encapsulation engine 222 to add encapsulation headers to the traffic of interest. The encapsulation engine 222 also adds the tag associated with packet classification to one or more fields within the encapsulation header. As described below, these encapsulation headers can be later used by the tool packet monitor applications 130 to identify one or more tool applications to receive the traffic of interest. Further, the tags added to the encapsulation header are used to identify the classification for the packets without having to separately analyze the packet contents. For example, where GRE (generic routing encapsulation) headers are used to encapsulate monitored traffic, the encapsulation engine 222 can add GRE destination identifiers within a GRE header for each packet within the traffic of interest to identify one or more tool applications to receive that packet, and available tool applications can be assigned unique GRE destination identifiers. Further, the encapsulation engine 222 can add a tag to a field with the GRE header, such as the key field with the GRE header, to identify the packet classification. The resulting encapsulated tool traffic 226 is then provided back to the network interface 206 for communication out of the client VM platform 104 as part of the VM platform traffic 208.

It is noted that the client packet monitor application 110 can also have a separate network interface, if desired, such that the tool traffic 226 and the management traffic 228 are communicated through this separate network interface rather than through the network interface 206. It is further noted that management traffic 228 can be received from the traffic management VM platform 150 to provide the GRE destination identifiers for available tool applications and to provide filter configurations for the filters 214 to apply to the received client traffic 224. The management traffic 228 can also provide the mapping data for the classification-to-tag data 111 that is stored and used by the controller 216. Further, the client packet monitor application 110 can also communicate information and/or requests back to the traffic management VM platform 150, as desired. In operation, the controller 216 can control the network TAP 212, the filters 214, and the tool packet interface 220 to operate according to management instructions received through the management traffic 228 within the VM platform traffic 208.

The encapsulation of the duplicated client traffic 224 by the encapsulation engine 222 allows for the copied packets to be delivered to destinations different from what is defined by the original packet envelope or headers. Once a packet has been captured by the network TAP 212, it is encapsulated with a header (e.g., GRE header) addressed directly to the receiving tool and tagged with the packet classification determined for the packet. With this encapsulation header in place, the packet can be placed on the general network infrastructure and processed as normal within the network communication paths 160. The encapsulated packet will flow within the network to its intended tool VM platform based on this new envelope or header. This encapsulation allows for tool traffic flows to travel within the same network as data plane traffic, and no additional risks are therefore introduced with respect to existing security constraints and protections within the network infrastructure. Further, using the encapsulation headers, multiple different packet streams from multiple different client VM platforms 104, 106, 108, . . . can be forwarded to one or more destination tool VM platforms 124, 126, 128, . . . regardless of any security or architectural restrictions originally placed within the network infrastructure. As such, no additional or separate security management is required within the existing traffic monitoring environment for the visibility overlay provided by the disclosed embodiments. Further, by adding the classification tag within the encapsulation header, the tool packet monitor application 130 receiving the encapsulated and tagged packet can determine the packet classification from the tag within the encapsulation header without having to analyze the contents of the encapsulated packet.

FIG. 3 is a block diagram of an example embodiment for a tool VM platform 124 that includes a tool packet monitor application 130. The tool packet monitor application 130 includes a tool interface 312, one or more filters 314, client packet interface 320, and controller 316. The client packet interface 320 also includes a de-encapsulation engine 322, and the controller 316 operates to store and use tag-to-classification data 131 and other configuration (CONFIG) data 318. The tool VM platform 124 in part operates to provide one or more tool applications 302 that analyze received packets within client traffic 326 from the tool packet monitor application 130. The tool applications 302 can also send and receive other traffic 304 directly through a network interface 306. The network interface 306 communicates VM platform traffic 308 with other VM platforms operating within the same VM host server and/or with external VM platforms or systems through the network communication paths 160. As described herein, this VM platform traffic 308 includes tool traffic 226 from one or more client packet monitor applications 110, management traffic 328 communicated with the traffic management VM platform 150, and any other traffic for the tool VM platform 124.

In operation, the client packet interface 320 receives the encapsulated tool traffic 226 communicated by the client packet monitor application 110 within one or more client VM platforms. The client packet interface 320 uses the de-encapsulation engine 322 to remove encapsulation headers from the traffic of interest within the encapsulated tool traffic 226. The controller 316 also reads the classification tag within the encapsulation header and uses the tag-to-classification mapping data 131 to determine the packet classification associated with the tag. For example, where GRE headers are used, the de-encapsulation engine 322 can remove GRE headers and use GRE destination identifiers within those header to identify one or more tool applications 302 to receive that packet. As indicated above, available tool applications 302 can be assigned unique GRE destination identifiers. In addition, the encapsulation engine 222 can extract the classification tag from the GRE header, and the controller 216 can determine the packet classification from the tag using the tag-to-classification data 131 without having to separately analyze additional packet contents. In addition, packets from different sources or packet flows with the same packet classification can be aggregated by the tool packet monitor application 130 prior to being output one or more tool applications 302. The de-encapsulated traffic can also be processed by one or more filters 314 to further select traffic of interest and/or desired tool destinations for the traffic of interest. The filtered traffic of interest is then provided to the tool interface 312, and this resulting client traffic 326 is communicated to the one or more tool applications 302. Result information from the tool applications 302 can then be communicated back through the network interface 306 as part of the VM platform traffic 308. The tool packet monitor application 130 can also have a separate network interface, if desired, such that the tool traffic 226 and the management traffic 328 are communicated through this separate network interface rather than through the network interface 306.

It is noted that management traffic 328 can be received from the traffic management VM platform 150 to provide the GRE destination identifiers for available tool applications 302 and to provide filter configurations for the filters 314. The management traffic 328 can also provide the mapping data for the tag-to-classification data 131 stored and used by the controller 216. Further, the tool packet monitor application 130 can also communicate information and/or requests back to the traffic management VM platform 150, as desired. In operation, the controller 316 can control the client packet interface 320, the filters 314, and the tool interface 312 to operate according to management instructions received through the management traffic 328 within the VM platform traffic 308.

It is further noted that rather than use the tool packet monitor application 130 to terminate the encapsulation tunnel (e.g., GRE tunnel), the tool applications 302 can instead terminate the tunnel directly. However, this would likely lead to a less efficient implementation. Using the tool packet monitor application 130, the encapsulation tunnels providing packets from one or more client packet monitor applications 110 can be terminated more efficiently, and associated packet traffic can be aggregated down to a single stream of relevant traffic using the controller 316 and/or filters 314. As such, the tool packet monitor application 130 can remove processing and filtering requirements that would otherwise have to be implemented by the tool applications 302 with respect to termination and aggregation of the tool traffic 226 to form the resulting client traffic 326. Further, as describe herein, the pre-classification and associated tags provided by the client packet monitor applications 110 allow for rapid determinations by filters 314 of resulting destinations for the packets.

Looking back to FIGS. 2-3, it is noted that the filters 214/314 can rely upon various portions of the content of network packets to identify packets and to determine which tool application is to receive the packets. For example, filters 214/314 can be configured to rely upon data and/or information associated with any network layer header values or packet field contents to perform such actions. With respect to network layers, packet-based communications are often described in terms of seven communication layers under the ISO/OSI (International Standards Organization/Open Systems Interconnect) model: application layer (L7), presentation layer (L6), session layer (L5), transport layer (L4), network layer (L3), data link layer (L2), and physical layer (L1). Packet headers associated with any of these layers as well as packet data payload contents, therefore, can be used by the filters 214/314. For example, information pertinent to identifying a packet, such as source ID and destination ID and protocol type, is often found in one or more network layer headers. Packets also have various other identification fields and content information within them that may be matched and used to collect and aggregate information about packets and related packet flows. Still further, because the filters 214/314 are operating as part of the packet monitor application 110/130 inside of the client VM platforms, the filters 214/314 can also rely upon non-packet content related information to determine tool destinations for the tool traffic 226. For example, information concerning application states, message states, operating system, and/or other information that is not within the packets themselves can be used by the filters 214/314. Thus, a wide variety of packet content and non-packet content related data and information can be identified and used by the filters 214/314.

Still further, it is noted that the configuration files 144, the configuration data 218/318, the packet classification mapping table 158, the classification-to-tag mapping data 111, and the tag-to-classification mapping data 131 described above can be stored within one or more data storage systems, and these data storage systems can be implemented using one or more non-transitory tangible computer-readable mediums such as FLASH memory, random access memory, read only memory, programmable memory devices, reprogrammable storage devices, hard drives, floppy disks, DVDs, CD-ROMs, and/or any other non-transitory data storage mediums. It is also noted that the VM host servers 102, 122, and 142 can be implemented using one or more programmable integrated circuits to provide the functionality described herein. For example, one or more processors (e.g., microprocessor, microcontroller, central processing unit, etc.), configurable logic devices (e.g., CPLD (complex programmable logic device), FPGA (field programmable gate array), etc.), and/or other programmable integrated circuit can be programmed with software or other programming instructions to implement the functionality described herein. It is further noted that software or other programming instructions for such programmable integrated circuits can be implemented as software or programming instructions embodied in one or more non-transitory computer-readable mediums (e.g., memory storage devices, FLASH memory, DRAM memory, reprogrammable storage devices, hard drives, floppy disks, DVDs, CD-ROMs, etc.) including software or programming instructions that when executed by the programmable integrated circuits cause them to perform the processes, functions, and/or capabilities described herein for the VM host servers 102, 122, and 142 and their respective components.

FIG. 4 is a diagram of an example embodiment 400 for GRE encapsulation and related classification tagging of monitored packets. For the example embodiment 400, packet 402 represents a packet received by a client packet monitor application 110. The packet 402 includes a packet header 404 and a packet payload 406, and the packet 402 can be formatted according to one or more network protocols such as Ethernet network protocols. As described herein, the client packet monitor application 110 analyzes the contents of the received packet being monitored to classify the packet, to filter the packet, and/or to process the packet according to other parameters provided for in the configuration data 218. In part, the client packet monitor application 110 determines a classification for the packet based upon the packet content analysis, as represented by bracket 407, and adds an encapsulation header to the monitored packet, such as a GRE header, to form an encapsulated packet 408 that includes a tag 422 identifying the classification. The encapsulated packet 408 includes the original packet header 404, the original payload 406, and the encapsulation header 410, which is a GRE header for the example embodiment 400. As described herein, a field within the encapsulation header 410 includes the tag 422 that identifies the classification 420 for the received packet, an address for the target network destination (e.g., tool client monitor application) for the encapsulated packet, and/or other information.

Looking to the GRE header 410 for the example embodiment 400, the GRE header 410 includes fields for an IP (Internet Protocol) header 411, one or more GRE flags 412, a protocol type 414, a key 416, and a sequence number 418. The IP header 411 is used as a delivery header and includes a destination IP address for the target network destination (e.g., tool client monitor application) for the GRE encapsulated packet. The GRE flags 412 are used to indicate the presence of additional fields for the GRE header 410 and/or other information. The protocol type 414 is used to indicate the type of GRE protocol being used. The key 416 is often not used for standard GRE headers; however, for the embodiments described herein the key 416 is used to store the tag 422 that identifies the packet classification 420. For some embodiments, a flag can be set in the GRE flags 412 to indicate that a GRE key field has been included within the GRE header. The sequence number 418 is used to identify individual packets that are sequentially related to each other so that one or more dropped packets can be more easily detected.

In operation, the tag 422 that is stored with the key field 416 is determined from the classification-to-tag mapping data 111. This classification-to-tag mapping data 111 maps the packet classifications 420 to tags 422. For example, a first packet classification (CLASS1) is mapped to a first tag (TAG1). A second packet classification (CLASS2) is mapped to a second tag (TAG2). And so on, with an Nth packet classification (CLASS(N)) being mapped to an Nth tag (TAG(N)). It is noted that the packet classifications can indicate one or more of variety of conditions and content types for the received packets. For example, packets can be classified based upon packet sources, packet destinations, communication types (e.g., email, voice, data, web, etc.), and/or other packet content related parameters. It is noted that for one example embodiment the tags can be unique multiple-bit digital words, such as 32-bit digital words with a different 32-bit value being associated each unique packet classification. Other variations could also be implemented.

FIG. 5 is a swim lane diagram of an example embodiment 500 where received packets are tagged based upon packet classifications determined by client packet monitor application 110 and processed by destination applications 130 to map the tags back to classifications. For example embodiment 500, communications and related processing are shown for a management platform 150, a client packet monitor application 110, and a destination (e.g., tool monitor) application 130. Initially, the management platform 150 communicates classification/tag mapping data to the monitor application 110 and to the destination application 130 through one or more messages 502. As indicated above, the monitor application 110 stores the mapping data as classification-to-tag data 111, and the destination application 130 stores the mapping data as tag-to-classification data 131. The management platform 150 can also communicate packet filter configuration information to the client packet monitor application 110 through one or more messages 504. As indicated by process block 506, the monitor application 110 than applies one or more filters to received packet flows based upon the packet filter configuration information. As indicated by process block 508, the monitor application 110 also analyzes the contents of received packets and classifies the packets. As indicated by process block 510, the monitor application 110 then maps the packet classifications to packet tags using the classification-to-tag mapping data 111, and the packets are then tagged with the identified tags. The monitor application 110 then sends the tagged packets to the destination application 130 through one or more messages 512. As indicated by process block 514, the destination application 130 then reads the tags within the tagged packets and maps the tags to packet classifications using the tag-to-classification mapping data 131. As indicated by process block 516, the destination application 130 then processes the packets based upon the packet classifications without having to analyze the additional contents of the packet itself to determine their classification.

FIG. 6 is a diagram of an example embodiment 600 for encapsulated packet data forwarded to a client packet monitor application 130 within a VM platform 124 using GRE encapsulation headers and GRE key identifiers representing packet classifications. For the example embodiment 600, packet data 602 and packet data 604 are received by VM platform 124 from a first client packet monitor application designated with 1.1.1.1 as an IP address, and packet data 606 and packet data 608 are received by VM platform 124 from a second client packet monitor application designated with 1.1.1.2 as an IP address. The VM platform 124 is designated with 2.1.1.1 as an IP address. With respect to the first client packet monitor application (1.1.1.1), packet data 602 is encapsulated with a GRE header that includes a first GRE key (KEY 1), and packet data 604 is encapsulated with a GRE header that includes a second GRE key (KEY 2). With respect to the second client packet monitor application (1.1.1.2), packet data 606 is encapsulated with a GRE header that includes the first GRE key (KEY 1), and packet data 608 is encapsulated with a GRE header that includes the second GRE key (KEY 2). For the embodiment 600, the first GRE key (KEY 1) is associated with web traffic, and the second GRE key (KEY 2) is associated with email traffic. It is noted that the IP addresses are included as a simplified example, and different IP and/or other source addresses could be assigned depending upon the network environment.

The GRE encapsulated packet data 602/604/606/608 is received by a virtual network interface card (vNIC) 610 for the VM platform (eth0) 124. The monitor application 130 receives the GRE encapsulated packets from the vNIC 610 and de-encapsulates the GRE encapsulation. Based upon this GRE de-encapsulation (GRE DECAP), the monitor application 130 effectively processes the different flows of packet data 602, 604, 606, and 608 using different vNICs 612, 614, 616, and 618 that together provide the functionality of the vNIC 610. The first vNIC (pktc0.1) 612 receives and de-encapsulates the packet data 602, identifies the tag to be the first GRE key (KEY 1), maps the first GRE key (KEY 1) to web traffic as the packet classification, and sends the classified packets to a packet aggregator 620 for web traffic. The second vNIC (pktc0.2) 614 receives and de-encapsulates the packet data 604, identifies the tag to be the second GRE key (KEY 2), maps the second GRE key (KEY 2) to mail traffic as the packet classification, and sends the classified packets to a packet aggregator 630 for mail traffic. The third vNIC (pktc1.1) 616 receives and de-encapsulates the packet data 606, identifies the tag to be the first GRE key (KEY 1), maps the first GRE key (KEY 1) to web traffic as the packet classification, and sends the classified packets to a packet aggregator 620 for web traffic. The fourth vNIC (pktc1.2) 618 receives and de-encapsulates the packet data 608, identifies the tag to be the second GRE key (KEY 2), maps the second GRE key (KEY 2) to mail traffic as the packet classification, and sends the classified packets to a packet aggregator 630 for mail traffic.

The first packet aggregator 620 aggregates the web related traffic and outputs the aggregated web traffic 626 to a first port for a tool application 302, for example, using a promiscuous raw socket. The first packet aggregator 620 includes an input vNIC (web0.in) 622 that aggregates the incoming packets from the vNICs 612/616 and outputs the aggregated web packets to an output vNIC (web0) 624. The second packet aggregator 630 aggregates the web related traffic and outputs the aggregated web traffic to a second port for the tool application 302, for example, using a promiscuous raw socket. The second packet aggregator 630 includes an input vNIC (mail0.in) 632 that aggregates the incoming packets from the vNICs 614/618 and outputs the aggregated mail packets to an output vNIC (mail0) 634. The tool application 302 then processes the web traffic 626 and the mail traffic 636. The tool application 302 an also be multiple tool applications that are used to process the aggregated web/mail traffic 626/636.

While example embodiment 600 of FIG. 6 shows a single tool monitor application 130 and a single tool application or VM platform 302, multiple tool monitor applications 130 can receive the encapsulated traffic and multiple tool applications. Further, additional tool monitor applications 130 as well as additional tool applications 302 can be dynamically added where additional processing resources are needed. It is noted that U.S. patent application Ser. No. 14/873,896, entitled "DIRECT NETWORK TRAFFIC MONITORING WITHIN VM PLATFORMS IN VIRTUAL PROCESSING ENVIRONMENTS" and filed Oct. 2, 2015, describes various embodiments that provide load balancing and dynamic application resources related to source/destination groups. This U.S. patent application Ser. No. 14/873,896 is again hereby incorporated by reference in its entirety.

FIG. 7A is a diagram of an example embodiment 700 where web traffic from multiple client monitor applications 110A-E within a source group 702 is provided to multiple destination monitor applications 130A-B with a destination group 704. The packets within the flows for packet data 706, 708, 710, 712, and 714 are encapsulated with GRE headers and all include a first GRE key (KEY 1) that identifies web traffic as the packet classification. Web traffic can be identified, for example, through a filter that identifies packets directed to TCP Port 80.

A first source group includes client monitor applications 110A, 110B, and 110C. The client monitor application 110A with IP address 1.1.1.1 sends packet data 706 that is received by a first destination monitor application 130A with IP address 2.1.1.1. The client monitor application 110B with IP address 1.1.1.2 sends packet data 708 that is also received by the first destination monitor application 130A. The client monitor application 110C with IP address 1.1.1.3 sends packet data 710 that is also received by the first destination monitor application 130A. The packet data 706, 708, and 710 are all encapsulated with GRE headers that include the first GRE key (KEY 1) as a tag that identifies web traffic as the packet classification. The first destination monitor application 130A aggregates the web packet traffic from the client monitor applications 110A/110B/110C and then outputs the aggregated web traffic through a network interface (web0) to a destination for further packet processing.

A second source group includes client monitor applications 110D and 110E. The client monitor application 110D with IP address 1.1.1.4 sends packet data 712 that is received by a second destination monitor application 130B with IP address 2.1.1.2. The client monitor application 110E with IP address 1.1.1.5 sends packet data 714 that is also received by the second destination monitor application 130B. The packet data 712 and 714 are all encapsulated with GRE headers that include the second GRE key (KEY 2) as a tag that identifies mail traffic as the packet classification. The second destination monitor application 130B aggregates the web packet traffic from the client monitor applications 110C/110D and then outputs the aggregated web traffic through a network interface (web0) to a destination for further packet processing.

Figure 7B:
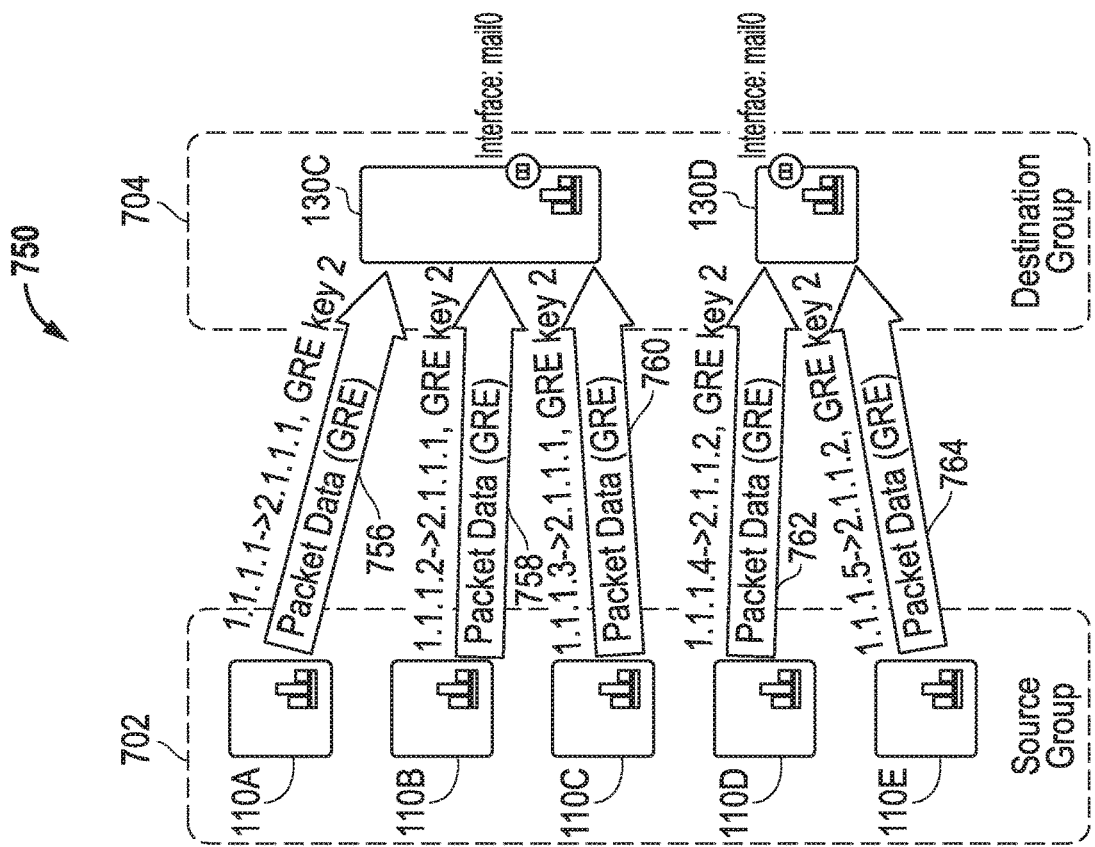
FIG. 7B is a diagram of an example embodiment where mail traffic from multiple client monitor applications within a source group is provided to multiple destination monitor applications with a destination group.
Figure 7A:
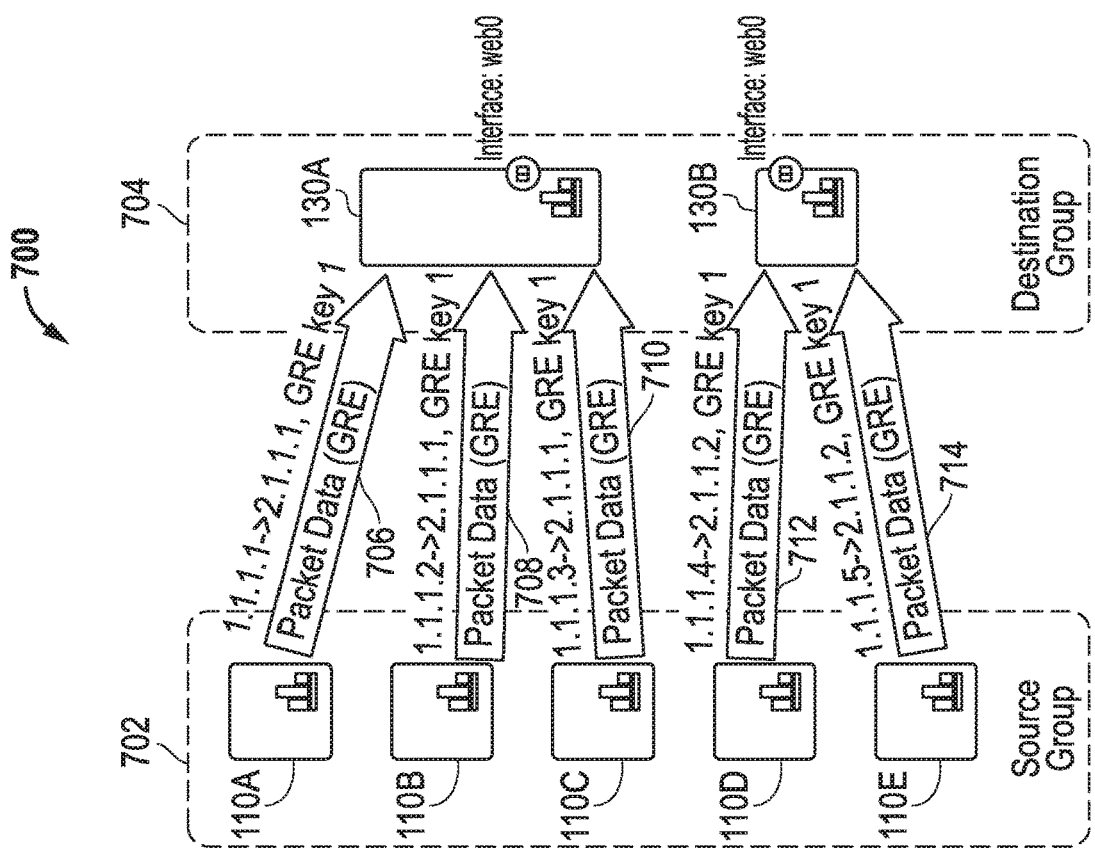
FIG. 7A is a diagram of an example embodiment where web traffic from multiple client monitor applications within a source group is provided to multiple destination monitor applications with a destination group.

FIG. 7B is a diagram of an example embodiment 750 where mail traffic from multiple client monitor applications 110A-E within a source group 702 is provided to multiple destination monitor applications 130A-B with a destination group 704. Example embodiment 750 operates the same as example embodiment 700 of FIG. 7A except that the packet traffic being forwarded is mail traffic instead of web traffic. As such, the packets within packet data tunnels 706, 708, 710, 712, and 714 are encapsulated with GRE headers and all include a second GRE key (KEY 2) that identifies mail traffic as the packet classification. Mail traffic can be identified, for example, through a filter that identifies and passes packets director to TCP Port 25.

For example embodiment 750, a first source group includes client monitor applications 110A, 110B, and 110C. The client monitor application 110A with IP address 1.1.1.1 sends packet data 706 that is received by a first destination monitor application 130A with IP address 2.1.1.1. The client monitor application 110B with IP address 1.1.1.2 sends packet data 708 that is also received by the first destination monitor application 130A. The client monitor application 110C with IP address 1.1.1.3 sends packet data 710 that is also received by the first destination monitor application 130A. The packet data 706, 708, and 710 are all encapsulated with GRE headers that include the first GRE key (KEY 1) as a tag that identifies mail traffic as the packet classification. The first destination monitor application 130A aggregates the mail packet traffic from the client monitor applications 110A/110B/110C and then outputs the aggregated mail traffic through a network interface (mail0) to a destination for further packet processing.

A second source group includes client monitor applications 110D and 110E. The client monitor application 110D with IP address 1.1.1.4 sends packet data 712 that is received by a second destination monitor application 130B with IP address 2.1.1.2. The client monitor application 110E with IP address 1.1.1.5 sends packet data 714 that is also received by the second destination monitor application 130B. The packet data 712 and 714 are all encapsulated with GRE headers that include the second GRE key (KEY 2) as a tag that identifies mail traffic as the packet classification. The second destination monitor application 130B aggregates the mail packet traffic from the client monitor applications 110C/110D and then outputs the aggregated mail traffic through a network interface (mail0) to a destination for further packet processing.

FIG. 8 is a block diagram of an example embodiment for a VM host server 102/122/142. For the example embodiment depicted, the VM host server 102/122/142 includes one or processors 802 or other programmable integrated circuits to provide a virtualization layer 112/132/152 including a plurality of virtual machine (VM) platforms 812, 814, . . . 816 that run one or more applications as described herein. The VM host server 102/122/142 also includes one or more network interface cards (NICs) 804, one or more input/output (I/O) ports 806, one or more data storage systems 808, and memory 803 coupled to communicate with each other through a system bus interconnect 810. In operation, virtualization layer 112/132/152 and the VM platforms (VM1, VM2 . . . VM(N)) 812, 814, . . . 816 run on top of a VM host operating system (OS) 114/134/154. For example, the VM host operating system 114/134/154, the virtualization layer 112/132/152, and the VM platforms 812, 814, . . . 816 can be initialized, controlled, and operated by the processors or programmable integrated circuits 802 which load and execute software code and/or programming instructions stored in the data storage systems 808 to perform the functions described herein. The VM platforms 812, 814, . . . 816 can be client VM platforms, tool VM platforms, and/or traffic management VM platforms, as described above.

The memory 803 can include one or more memory devices that store program instructions and/or data used for operation of the VM host server 102/122/142. For example, during operation, one or more of the processor(s) 802 can load software or program instructions stored in the data storage systems 808 into the memory 803 and then execute the software or program instructions to perform the operations and functions described herein. In addition, for operation, one or more of the processors 802 or other programmable integrated circuit(s) can also be programmed with code or logic instructions stored in the data storage systems 808 to perform the operations and functions described herein. It is noted that the data storage system(s) 808 and the memory 803 can be implemented using one or more non-transitory tangible computer-readable mediums, such as for example, data storage devices, FLASH memory devices, random access memory (RAM) devices, read only memory (ROM) devices, other programmable memory devices, reprogrammable storage devices, hard drives, floppy disks, DVDs, CD-ROMs, and/or other non-transitory data storage mediums. It is further noted that the programmable integrated circuits can include one or more processors (e.g., central processing units (CPUs), controllers, microcontrollers, microprocessors, hardware accelerators, ASICs (application specific integrated circuit), and/or other integrated processing devices) and/or one or more programmable logic devices (e.g., CPLDs (complex programmable logic devices), FPGAs (field programmable gate arrays), PLAs (programmable logic array), reconfigurable logic circuits, and/or other integrated logic devices). Other variations and processing or computing platforms can also be implemented while still taking advantage of the client monitor application pre-classification techniques described herein.

The virtualization layer 112/132/152 for the VM platforms described herein can be implemented using any desired virtualization layer, such as using a hypervisor or a container engine, that provides a virtual processing environment for the VM platforms. Using a hypervisor, as shown in FIG. 9A below, the client/tool packet monitor application 110/130 operates in addition to an application 902/912 on a guest operating system within one of the VM platforms 812/814 which in turn run on top of the hypervisor as the virtualization layer 112/132/152. Using a container engine, as shown in FIG. 9B below, the client/tool packet monitor application 110/130 operates along with applications 902/912 within a VM platform 812 that operates on top of the container engine. As depicted in FIG. 9B, the VM platform 812 for this embodiment operates as a virtual computing platform without the emulated hardware (HW) 908 and without the guest operating system (OS) 906 that are shown with respect to the embodiment of FIG. 9A. In this container engine embodiment, the applications 902/912 as well as the client/tool packet monitor application 110/130 are containers or other software components within a single VM platform 812. This container engine embodiment of FIG. 9B thereby provides a more streamlined technique for adding the client/tool packet monitor application 110/130 to a VM platform as the containers are relatively isolated from each other. For one embodiment, the container engine can be implemented as a DOCKER container for a Linux operating system configured to execute DOCKER containers, which are software components that are designed to be compatible with a Linux-based DOCKER container engine. Other variations could also be implemented.

FIG. 9A is a block diagram of an example embodiment 900 for a VM host server 102/122/132 that uses a hypervisor to provide a virtualization layer 112/132/152. For the embodiment 900, VM platforms 812 and 814 operate on top of hypervisor 112/132/152 which in turn operates on top of host operating system (OS) 114/134/154 which in turn operates on top of server hardware 116/136/156. For this embodiment 900, the VM host server 102/122/142 provides emulated hardware (HW) resources 908 and a guest operating system (OS) 906 for VM platform 812, and VM platform 812 executes binary code (BINS) or libraries (LIBS) 904 on top of the guest operating system 906 to provide a first application (APP A) 902. Similarly, the VM host server 102/122/142 provides emulated hardware (HW) resources 918 and a guest operating system (OS) 916 for VM platform 814, and VM platform 814 executes binary code (BINS) or libraries (LIBS) 914 on top of guest operating system 916 to provide a second application (APP B) 912. Thus, each of the VM platforms 812 and 814 have separate emulated hardware resources 908/918 and guest operating systems 906/916. For embodiment 900 as indicated above, a client/tool packet monitor application 110/130 when installed can operate within one of the VM platforms 812/814 on top of the guest OS 906/916 along with one of the application 902/912.

FIG. 9B is a block diagram of an example embodiment 950 for a VM host server 102/122/132 that uses a container engine to provide a virtualization layer 112/132/152. For the embodiment 950, VM platform 812 operates on top of container engine 112/132/152 which in turn operates on top of host operating system (OS) 114/134/154 which in turn operates on top of server hardware 116/136/156. For this embodiment 950, however, the VM platform 812 executes binary code (BINS) or libraries (LIBS) 904 directly on top of the container engine 112/132/152 to provide a first application (APP A) 902 and executes binary code (BINS) or libraries (LIBS) 914 directly on top of the container engine 112/132/152 to provide a second application (APP B) 912. As such, the container engine 112/132/152 provides a direct interface to the host operating system 114/134/154 without need for emulated hardware (HW) resources 908/918 and/or guest operating systems 906/916 as used in FIG.

9A. For embodiment 950 as indicated above, a client/tool packet monitor application 110/130 when installed can operate along with the other applications 902/912 on top of the container engine 112/132/152 within the VM platform 812.

It is further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the client monitor application pre-classification techniques described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method to monitor packet traffic, comprising:
   communicating network packets using one or more client applications operating within a client virtual machine (VM) platform operating within a first VM host server;
   operating a client packet monitor application within the client VM platform;
   operating a tool packet monitor application within a tool VM platform operating within a second VM host server;
   at the client packet monitor application:
      receiving mapping data from a traffic configuration platform;
      storing the mapping data as classification-to-tag mapping data;
      monitoring the network packets to generate monitored packets representing traffic of interest;
      determining packet classifications for the monitored packets based upon contents of the monitored packets;
      identifying tags associated with the packet classifications by searching the classification-to-tag mapping data to identify the tags associated with the packet classifications;
      encapsulating the monitored packets with encapsulation headers to form encapsulated packets, the encapsulation headers including the tags and delivery headers separate from the tags, and the delivery headers including a destination address for the tool packet monitor application; and
      forwarding the encapsulated packets to the tool VM platform based upon the delivery headers and not based upon the tags associated with the packet classifications; and
   at the tool packet monitor application:
      receiving mapping data from the traffic configuration platform;
      storing the mapping data as tag-to-classification mapping data;
      receiving the encapsulated packets;
      identifying packet classifications associated with the tags included within the encapsulated packets by searching the tag-to-classification mapping data to identify the tags associated with the packet classifications;
      removing the encapsulation headers from the encapsulated packets to generate de-encapsulated packets; and
      forwarding the de-encapsulated packets to one or more network destinations based upon the packet classifications.

2. The method of claim 1, wherein the one or more network destinations comprise one or more tool applications operating within the tool VM platform.

3. The method of claim 1, wherein the encapsulation headers are GRE (generic routing encapsulation) headers.

4. The method of claim 3, wherein the tags are included within a key field for the GRE headers, and wherein each tag represents a unique packet classification.

5. The method of claim 1, wherein the traffic configuration platform is operating within a third VM host server.

6. The method of claim 1, wherein network packets are communicated by a plurality of client VM platforms operating within at least one of the first VM host server or the first VM host server and one or more additional VM host servers, each of the client VM platforms having a client packet monitor application preforming the monitoring, determining, identifying, encapsulating, and forwarding.

7. The method of claim 6, wherein the tool packet monitor application receives encapsulated packets from the plurality of client VM platforms, aggregates de-encapsulated packets with same packet classifications into an aggregated packet flow, and forwards the aggregated packet flow to one or more network destinations.

8. The method of claim 6, wherein the encapsulated network packets are received by a plurality of tool VM platforms operating within at least one of the second VM host server or the second VM host server and one or more additional VM host servers, each of the tool VM platforms having a tool packet monitor application performing the receiving, identifying, removing, and forwarding.

9. The method of claim 8, wherein the tool packet monitor applications within the plurality of tool VM platforms aggregate de-encapsulated packets with same packet classifications into aggregated packet flows and forward the aggregated packet flows to one or more network destinations.

10. The method of claim 8, wherein the plurality of client VM platforms operate within a plurality of VM host servers including the first VM host server, and wherein the plurality of tool VM platforms operate within a plurality of tool VM platforms including the second VM host server.

11. The method of claim 1, wherein each of the VM platforms operates on a virtualization layer within the one or more VM host servers, the virtualization layer comprising at least one of a hypervisor or a container engine running within the one or more VM host servers.

12. A system to monitor packet traffic, comprising:
a first virtual machine (VM) host server configured to host one or more client applications operating within a client virtual machine (VM) platform, the one or more client applications being configured to generate network packets; and
a second VM host server configured to host a tool VM platform;
wherein the first VM host server is further configured to host a client packet monitor application, the client packet monitor application being configured to:
receive mapping data from a traffic configuration platform;
store the mapping data as classification-to-tag mapping data
monitor the network packets to generate monitored packets representing traffic of interest;
determine packet classifications for the monitored packets based upon contents of the monitored packets;
identify tags associated with the packet classifications by searching the classification-to-tag mapping data to identify the tags associated with the packet classifications;
encapsulate the monitored packets with encapsulation headers including the tags to form encapsulated packets, the encapsulation headers also including delivery headers separate from the tags, and the delivery headers including a destination address for the tool packet monitor application; and
forward the encapsulated packets to the tool VM platform based upon the delivery headers and not based upon the tags associated with the packet classifications; and
wherein the second VM host server is further configured to host a tool packet monitor application configured to:
receive mapping data from the traffic configuration platform;
store the mapping data as the tag-to-classification mapping data;
receive the encapsulated packets;
identify packet classifications associated with the tags included within the encapsulated packets by searching the tag-to-classification mapping data to identify the tags associated with the packet classifications;
remove the encapsulation headers from the encapsulated packets to generate de-encapsulated packets; and
forward the de-encapsulated packets to one or more network destinations based upon the packet classifications.

13. The system of claim 12, wherein the one or more network destinations comprise one or more tool applications configured to operate within the tool VM platform.

14. The system of claim 12, wherein the encapsulation headers are GRE (generic routing encapsulation) headers.

15. The system of claim 14, wherein the tags are included within a key field for the GRE headers, and wherein each tag represents a unique packet classification.

16. The system of claim 12, wherein the traffic configuration platform is operating within a third VM host server.

17. The system of claim 12, wherein a plurality of client VM platforms are configured to operate within at least one of the first VM host server or the first VM host server and one or more additional VM host servers, each of the client VM platforms being configured to host a client packet monitor application configured to generate monitored packets representing traffic of interest, determine packet classifications for the monitored packets based upon contents of the monitored packets, identify tags associated with the packet classifications, encapsulate the monitored packets with encapsulation headers including the tags to form encapsulated packets, and forward the encapsulated packets to the tool VM platform.

18. The system of claim 17, wherein the tool packet monitor application is further configured to receive encapsulated packets from the plurality of client VM platforms, to aggregate de-encapsulated packets with same packet classifications into an aggregated packet flow, and to forward the aggregated packet flow to one or more network destinations.

19. The system of claim 17, wherein a plurality of tool VM platforms are configured to receive the encapsulated network packets and to operate within at least one of the second VM host server or the second VM host server and one or more additional VM host servers, each of the tool VM platforms being configured to host a tool packet monitor application configured to receive the encapsulated packets, identify packet classifications associated with the tags included within the encapsulated packets, remove the encapsulation headers from the encapsulated packets to generate de-encapsulated packets, and forward the de-encapsulated packets to one or more network destinations based upon the packet classifications.

20. The system of claim 19, wherein the tool packet monitor applications within the plurality of tool VM platforms are further configured to aggregate de-encapsulated packets with same packet classifications into aggregated packet flows and to forward the aggregated packet flows to one or more network destinations.

21. The system of claim 19, wherein the plurality of client VM platforms are configured to operate within a plurality of VM host servers including the first VM host server, and wherein the plurality of tool VM platforms are configured to operate within a plurality of tool VM platforms including the second VM host server.

22. The system of claim 12, wherein each of the VM platforms operates on a virtualization layer within the one or more VM host servers, the virtualization layer comprising at least one of a hypervisor or a container engine running within the one or more VM host servers.

23. The method of claim 1, wherein the packet classifications comprise different communication types for the monitored packets.

24. The method of claim 23, wherein the different communication types comprise at least one of email, voice, data, or web.

25. The system of claim 12, wherein the different packet classifications comprise communication types for the monitored packets.

26. The method of claim 25, wherein the different communication types comprise at least one of email, voice, data, or web.

\* \* \* \* \*